(12) United States Patent
Manabe et al.

(10) Patent No.: US 7,088,333 B1
(45) Date of Patent: Aug. 8, 2006

(54) SURFACE LIGHTING DEVICE AND PORTABLE TERMINAL USING THE SAME

(75) Inventors: Seiji Manabe, Fukuoka (JP); Kensei Fukuda, Saga (JP); Takahiro Oomori, Fukuoka (JP); Shinobu Kamizuru, Fukuoka (JP); Sumio Tate, Fukuoka (JP); Kazuyuki Nakashima, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/524,587

(22) Filed: Mar. 13, 2000

(30) Foreign Application Priority Data

| Mar. 12, 1999 | (JP) | ................................... 11-066415 |
| Mar. 12, 1999 | (JP) | ................................... 11-066418 |
| Mar. 15, 1999 | (JP) | ................................... 11-068167 |
| Oct. 7, 1999 | (JP) | ................................... 11-286519 |
| Mar. 15, 1919 | (JP) | ................................... 11-068166 |

(51) Int. Cl.
*G09G 3/36* (2006.01)

(52) U.S. Cl. ......................... 345/102; 362/26; 362/561; 349/61

(58) Field of Classification Search ................ 345/87, 345/102; 349/61, 63, 64, 65, 67; 362/26, 362/27, 29, 30–31, 555, 558, 560, 561; 385/40, 385/14
See application file for complete search history.

(56) References Cited

U.S. PATENT DOCUMENTS

| 4,729,185 A | * | 3/1988 | Baba ........................... 40/546 |
| 5,377,083 A | * | 12/1994 | Tada ............................ 362/613 |
| 5,404,277 A | * | 4/1995 | Lindblad ...................... 362/31 |
| 5,528,709 A | * | 6/1996 | Koike et al. .................. 385/14 |
| 6,167,182 A | | 12/2000 | Shinohara et al. |
| 6,196,691 B1 | * | 3/2001 | Ochiai .......................... 362/31 |
| 6,213,613 B1 | * | 4/2001 | Muller ......................... 362/23 |
| 6,767,107 B1 | * | 7/2004 | Leifer et al. .................. 362/33 |

FOREIGN PATENT DOCUMENTS

| JP | 58-138903 | 9/1983 |
| JP | 61-255324 | 11/1986 |
| JP | 3-32075 | 5/1991 |

(Continued)

OTHER PUBLICATIONS

Japanese Official Action dated Nov. 21, 2002, for JP 10-317397.
Japanese Official Action dated Apr. 23, 2002 for 11-289,519.

*Primary Examiner*—Kent Chang
(74) *Attorney, Agent, or Firm*—RatnerPrestia

(57) ABSTRACT

A surface lighting device has one single light source and a light-guide-board. The board includes a light-guiding-section and a light-emitting-section. A shorter side of the light-guiding-section is not more than 8 mm, and an area of the light-emitting-section is not less than 500 mm². The light-emitting-section has the following features: (1) a ratio of min. luminance vs. max. luminance is not less than 0.3; (2) an average luminance ranges from 1 cd/m² to 200 cd/m², and (3) a change in luminance per unit length is not more than (average luminance)×100 cd/m³. Employing plural light-emitting-elements in one light source allows the lighting device to produce versatile colors. The light source, light-guide-board and a holder are structured and shaped in optimum way, so that unevenness in luminance of the device is reduced. An LCD unit incorporating this surface lighting device increases its display quality, and a portable terminal incorporating this LCD unit produces easy-to-lead display.

19 Claims, 32 Drawing Sheets

FOREIGN PATENT DOCUMENTS

| | | |
|---|---|---|
| JP | 05-013818 | 1/1993 |
| JP | 06-051130 | 2/1994 |
| JP | 3016945 | 8/1995 |
| JP | 07-320514 | 12/1995 |
| JP | 08-094844 | 4/1996 |
| JP | 09-021916 | 1/1997 |
| JP | 09-152360 | 6/1997 |
| JP | 09-230338 | 9/1997 |
| JP | 09-259623 | 10/1997 |
| JP | 10-199318 | 7/1998 |
| JP | 10-223021 | 8/1998 |
| JP | 10-255530 | 9/1998 |
| JP | 10-293213 | 11/1998 |
| JP | 11-52139 | 2/1999 |
| JP | 2000-19514 | * 1/2000 |
| WO | WO 98/19105 | 5/1998 |

* cited by examiner (a)  (b)

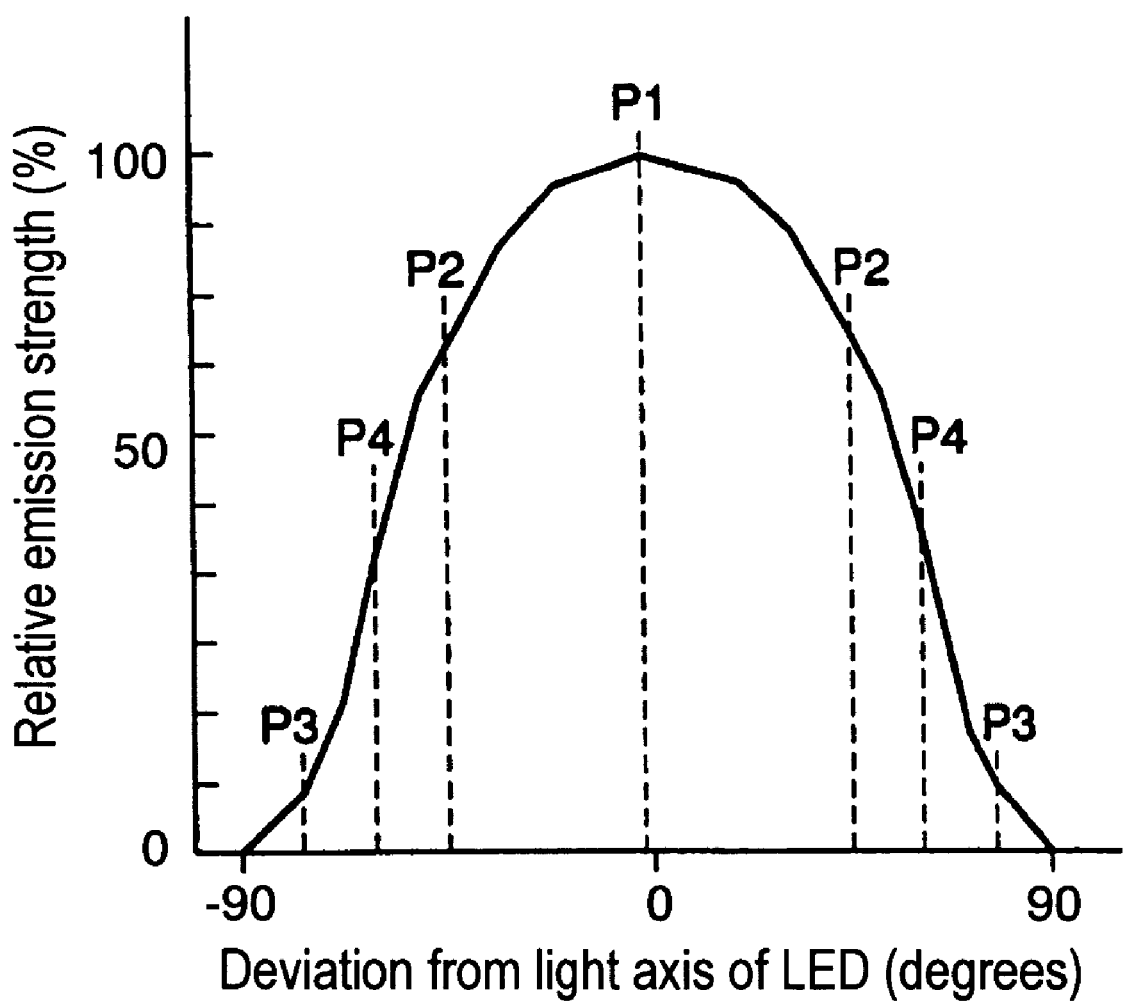

SURFACE LIGHTING DEVICE AND PORTABLE TERMINAL USING THE SAME

FIELD OF THE INVENTION

The present invention relates to surface lighting devices for liquid crystal displays, and more particularly it relates to surface lighting devices having light emitting diodes and the like for lighting the displays as well as for portable terminals using the surface lighting devices.

BACKGROUND OF THE INVENTION

Surface lighting devices have been used for backlighting of liquid crystal displays (LCD) employed in cellular-phones, portable terminals and the like. Light emitting diodes (LED) in chip-shape have been used as light sources of this surface lighting device because of LED's small size and low power consumption. Lately, LEDs replace cold-cathode tubes as surface lighting devices of various portable-terminals including information terminals, digital cameras, camcorders because LEDs are superior in smaller size, longer battery life, and withstanding shocks.

Various structures are available in those conventional surface-lighting-devices using LEDs. For instance, Japanese Patent Examined Application Publication No. H03-32075 discloses that LEDs are disposed behind an LCD panel thereby emitting light directly to the back face of the LCD panel in order to light the panel. However, thinner bodies of the terminals are required in the market, and problems of disposing electronic circuits behind LCD elements are not favorable for this structure, i.e. a structure where LEDs are disposed directly behind the LCD panel becomes inconvenient. Therefore, fewer models of cellular phones and the like use this structure as the surface lighting device for LCD.

Regarding the surface lighting device for LCDs of cellular phones, LEDs are disposed outside the display face of LCD elements in many cases. For instance, Japanese Patent Examined Application Publication No. H05-21233 teaches that LEDs are disposed outside the display face of LCD elements so that the light of the LEDs is guided under the LCD elements by using a reflective face and a resin board.

However, the conventional surface lighting device as discussed above distributes uneven luminance, i.e. the light is distributed not uniformly if only one LED is provided at the center of the device. In this case, neighbor of the LED is only well-lighted, and periphery of the LED is poorly-lighted. Such luminance distribution becomes more obvious at a greater area to be lighted. This uneven luminance distribution would result in poor readability of the display, and further, produce an unrecognizable displayed section due to poor-light. To overcome this problem, a number of LEDs as a light source is increased, and spaces between the LEDs arrayed are narrowed, so that the luminance distribution is improved. This is a conventional measure against the problem.

When the number of LEDs is increased in the surface lighting device of the LCD used in cellular phones and other portable terminals, it not only boosts the power consumption, but also incurs complicated works for mounting the LEDs as well as a cost increase.

When a plurality of LEDs are used, differences between wavelengths of lights emitted from the LEDs produce an uneven color. To be more specific, in many cases, each LED differs in a light wavelength emitted therefrom by several nano-meters due to individual characteristics. Such a little difference; however, produces great unevenness in a color for human eyes when respective areas illuminated by each LED and their borders are compared each other. In order to eliminate the unevenness in a color, emit each LED and measure the light wavelength, thereby collecting the LEDs having the same wavelength. This operation is required to assemble one surface lighting device free from a dispersion of the light wavelengths. This operation; however, requires a cumbersome 100% inspection on the LEDs, and this is one of the causes to lower the productivity of the surface lighting devices.

Also, luminance differences among the LEDs due to individual characteristics produce uneven luminance of the surface lighting device.

Another method for improving the unevenness in a color and luminance is to use one LED, and a light guiding section of a light guide board is elongated so that light can be scattered sufficiently. Then the light is emitted from a light emitting section. This method; however, limits the downsizing of the surface lighting devices.

SUMMARY OF THE INVENTION

A surface lighting device has the following structure:
one light source;
a light guiding section having a length not more than 8 mm in the minor axis direction;
a light emitting area of a light guide member being not less than 500 mm$^2$;
a ratio of minimum luminance vs. maximum luminance, being not less than 0.3;
an average luminance ranging between 1cd/m$^2$ and 200 cd/m$^2$; and
a change amount per unit length in luminance of a light emitting section being not more than the value of (the average luminance)×100 cd/m$^3$.

Another structure is available as follows:
a light guiding section having a length not more than 8 mm in the minor axis direction;
a light emitting area of a light guide member being not less than 500 mm$^2$;
one light element out of plurality of light elements being emitted anytime and the other light element s are emitted independently on demand;
a ratio of a min luminance vs. a max. luminance being not less than 0.3;
an average luminance ranging between 1cd/m$^2$ and 200 cd/m$^2$; and
a change amount per unit length in luminance of a light emitting section being not more than the value of (the average luminance)×100 cd/m$^3$.

A portable terminal of the present invention comprises the following elements:
a display device having the surface lighting device at a lower part thereof;
a converter for converting at least one of a data signal or an audio signal into a transmission signal, or converting a received signal into at least one of a data signal or an audio signal;
an antenna for receiving the transmission signal and the received signal; and
a controller for controlling the respective parts discussed above.

BRIEF DESCRIPTION OF THE DRAWINGS

FIG. 47 is a graph illustrating relative light intensity emitted from an LED in accordance with an exemplary embodiment of the present invention.

DETAILED DESCRIPTION OF PREFERRED EMBODIMENT

Exemplary Embodiment 1

The first exemplary embodiment is demonstrated hereinafter with reference to FIG. 1 through FIG. 5.

Figure 1:
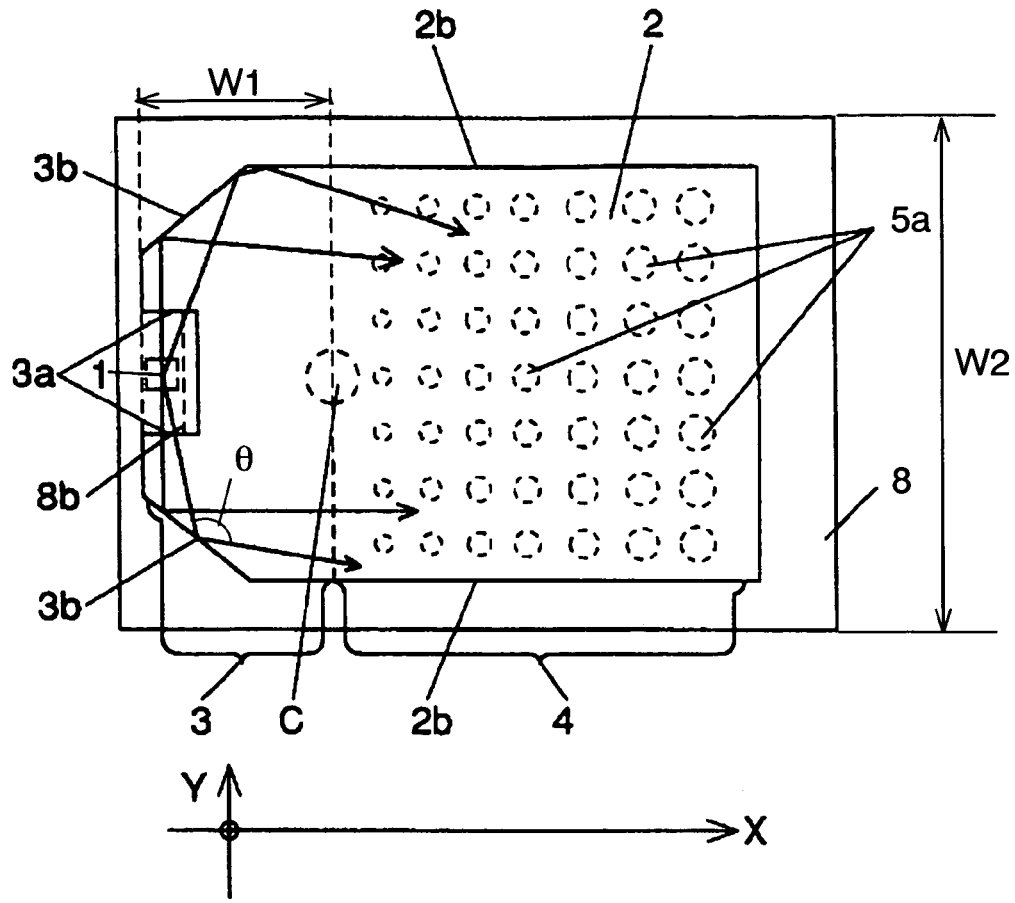
FIG. 1 is a plan view of a surface lighting device in accordance with a first exemplary embodiment of the present invention.

In FIG. 1, a light source in small size such as a midget-light-bulb or an LED is employed as light source 1. More specifically, a spot light-source defined as follows is preferably employed: a volume is not more than 12 mm$^3$, a thickness is not more than 2 mm, and a light emitting area is not more than 2.8 mm$^2$. A highly-efficient LED, in particular, satisfying the definition discussed above produces luminance in more even distribution, thereby realizing an easy-to-see surface lighting device. The embodiment demonstrated hereinafter employs an LED as light source 1. Cellular phones and portable-information-terminals, both are small in size, require a ultra tiny and thin light source, and LED 1 is thus preferably not more than 3 mm$^3$ in volume. In this case, if LED 1 is mountable directly onto a circuit board, it saves cumbersome wiring and improves the manufacturing productivity.

The surface lighting device employing one single LED can reduce the power consumption, thereby being suitable for portable apparatuses. The construction of employing one single LED is free from uneven colors as well as uneven luminance caused by different light wavelengths and a disperse of light emitting efficiency caused by a plurality of LEDs. This eliminates screening of LEDs thereby substantially increasing the productivity of the surface lighting device and lowering the cost.

Figure 14:
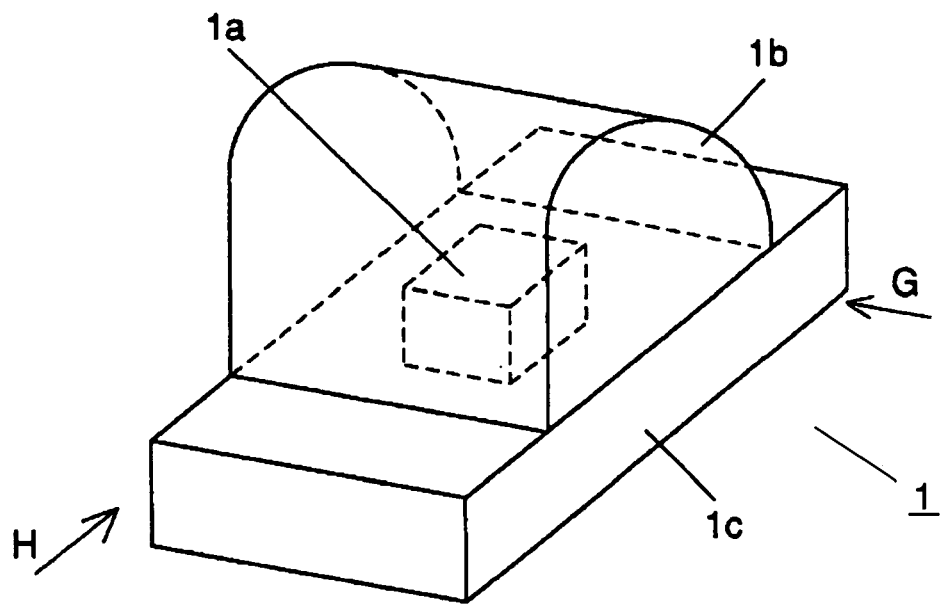
FIG. 14 is a perspective view of an LED of a surface lighting device in accordance with the first exemplary embodiment of the present invention.
Figure 15:
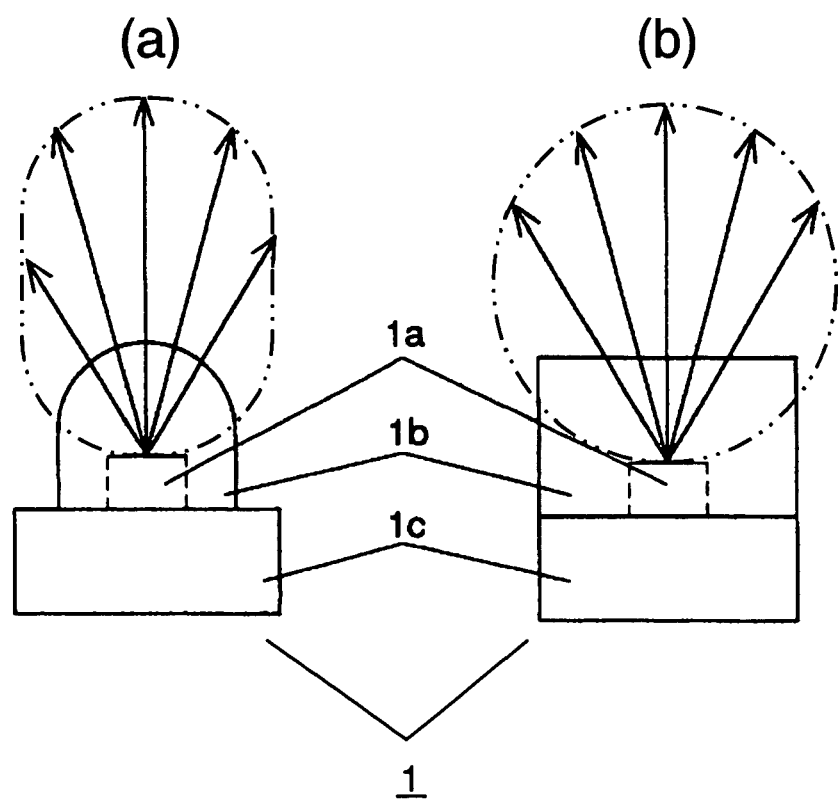
FIG. 15 illustrates light intensity distribution of the LED used in a surface lighting device in accordance with the first exemplary embodiment of the present invention.

Another preferable structure of LED 1 is demonstrated with reference to FIG. 14 and FIG. 15.

FIG. 14 is a perspective view of a light source of the surface lighting device in the first embodiment, and FIG. 15 illustrates an intensity distribution of the light emitted from the LED used as the light source. In FIG. 14, light emitting element 1a is surrounded by lens 1b and is mounted onto base substrate 1c. Lens 1b is preferably made of epoxy resin because the epoxy resin is highly light transparent and withstands a high temperature at a soldering step provided later. Lens 1b is shaped in a semi-cylinder as shown in FIG. 14. LED 1 emits light through lens 1b following the intensity distribution shown in FIG. 15. When the emitted light is viewed in direction "G" as shown in FIG. 14, the light is distributed sharply and has a peak just above emitting element 1b because of the curve of lens 1b as shown in FIG. 15(a). When the emitted light is viewed in direction "H" as shown in FIG. 14, the light is distributed moderately as shown in FIG. 15(b). When LED 1 thus formed is disposed in the surface lighting device, the light once hitting surrounding member can be reduced, thereby reducing absorbed loss of light energy due to reflection and absorption of the light. As a result, the utilization factor of the light is increased.

Figure 2:
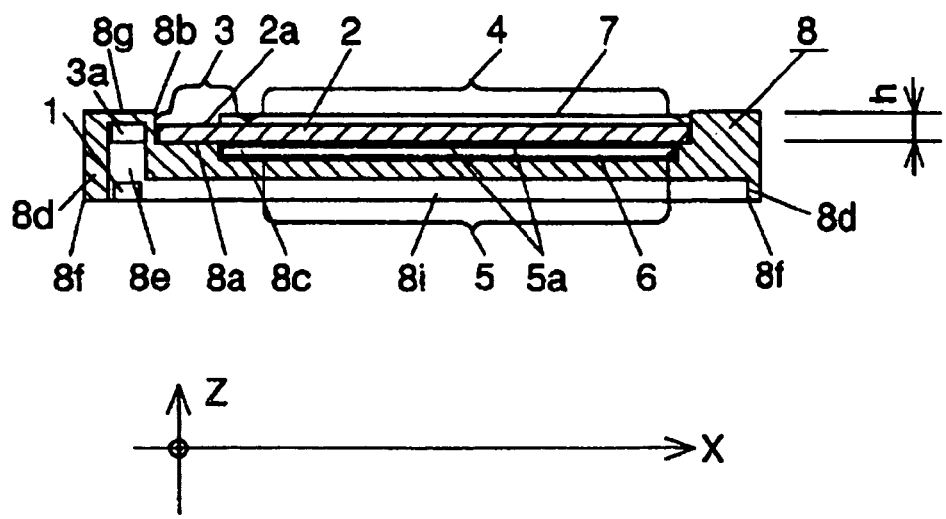
FIG. 2 is a lateral view of the surface lighting device in accordance with the first exemplary embodiment of the present invention.
Figure 3:
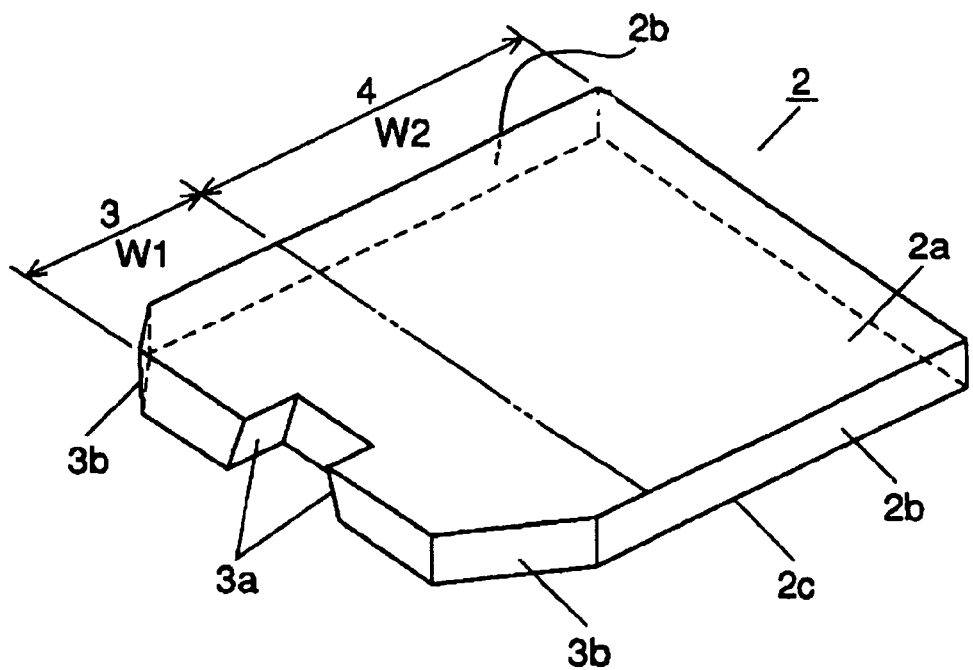
FIG. 3 is a perspective view of a light guide board in accordance with the first exemplary embodiment of the present invention.
Figure 4:
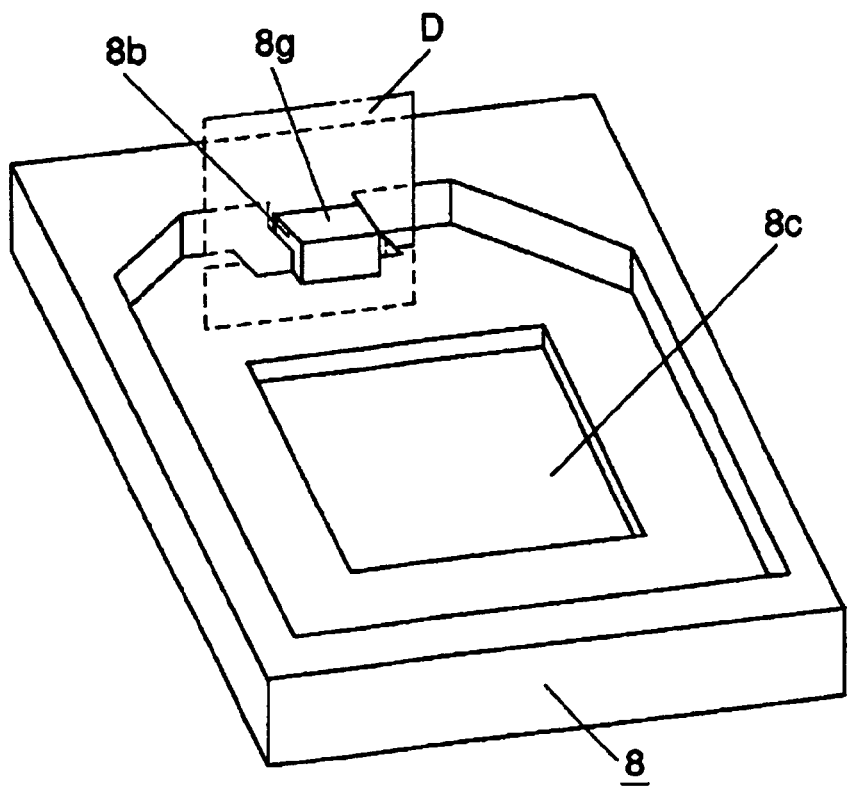
FIG. 4 is a perspective view of a holder in accordance with the first exemplary embodiment of the present invention.
Figure 5:
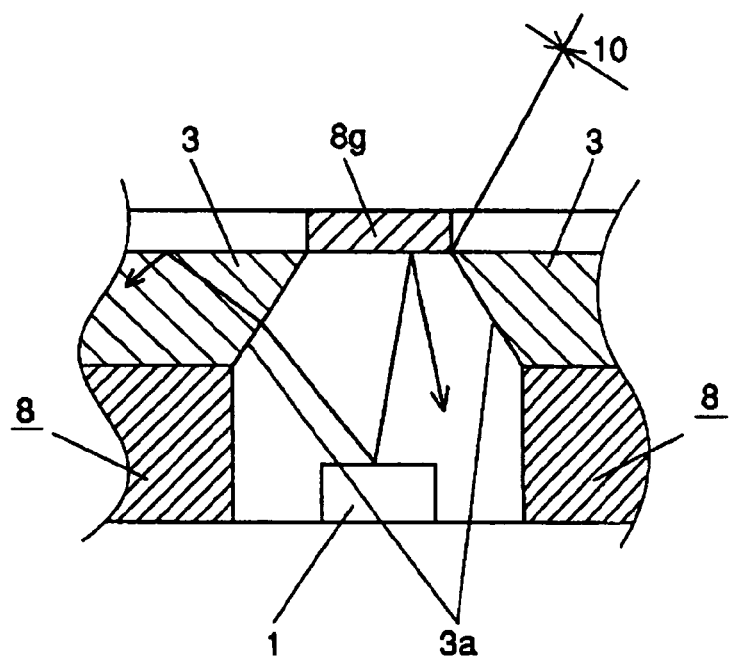
FIG. 5 is a cross section of a neighbor of a barrier plate in accordance with the first exemplary embodiment of the present invention.

In the case discussed above, an angle formed by the axial direction of the semi-cylinder and X direction shown in FIGS. 1 and 2 preferably approximates to 90 degree, so that the better utilization factor of the light is expected. These two directions preferably forms right angles, because the maximum utilization factor is expected in this case.

In this first embodiment, one LED having one light-emitting-element is disposed in a surface lighting device. However, if one LED with a plurality of light emitting elements having different light wavelengths is disposed in the surface lighting device and then each current flowing through respective elements is controlled, the device can light not only in colors corresponding to a number of elements but also in any half tones.

Figure 16:
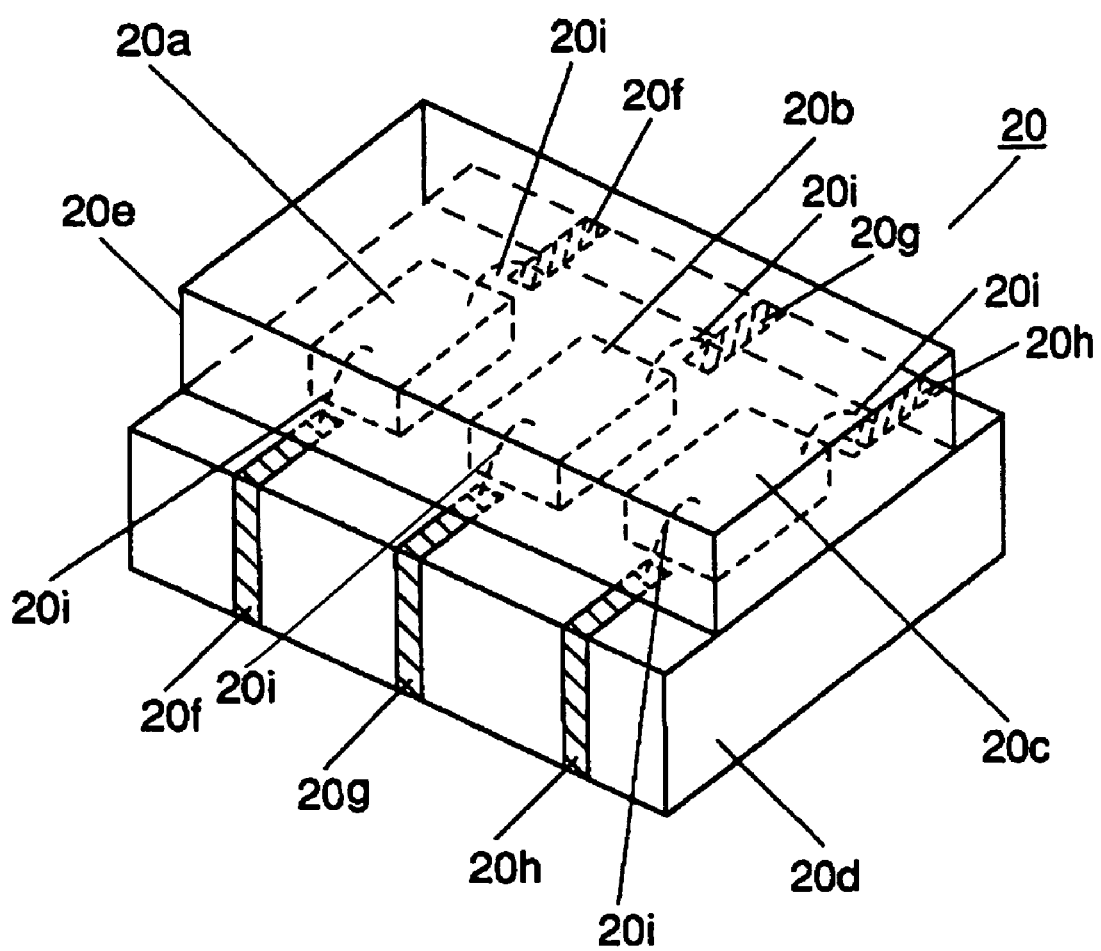
FIG. 16 is a perspective view of an LED in accordance with the first exemplary embodiment of the present invention.

FIG. 16 is a perspective view of an LED in accordance with the first embodiment. LED 20 comprises three light emitting elements having different light wavelengths. Three elements 20a, 20b and 20c are mounted onto substrate 20d. Element 20a emits approx. blue color, element 20b emits approx. green color and element 20c emits approx. red color.

Substrate 20d is preferably made from a material of highly insulated and highly thermal conductive.

Power feeding electrodes 20f, 20g and 20h are formed on substrate 20d so that the electrodes can power elements 20a, 20b and 20c. A controller (not shown) is disposed for controlling the powers fed to the elements so that light emitted from light-emitting-elements 20a, 20b and 20c can be controlled. As a result, the surface lighting device can produce any colors.

The electrodes 20f, 20g and 20h are extended to at least one of a lateral face or a back face so that they can be terminals for coupling LED 20 when LED 20 is mounted onto a circuit board. The electrodes 20f, 20g and 20h can be formed by a thin film or a thick film so that LED 20 can be directly mounted onto the surface of the circuit board. As a result, the productivity is increased.

Lead-wires 20i are used for coupling the electrodes 20f, 20g, 20h with the electrodes (not shown) formed on light emitting elements 20a, 20b, 20c. A wire-bonding method is used, in general, for this coupling.

A transparent member 20e covering elements 20a, 20b, 20c is disposed on substrate 20d, and this member 20e restrains the elements from being deteriorated due to exposure to the air. This also prevents the coupling terminals (e.g. coupled by the wire-bonding) from being cut or disengaged due to vibrations at an actual use or in manufacturing.

When this single LED having the construction discussed above is used, the surface lighting device can change lighting colors without consuming the power so much because it does not employ a plurality of LEDs. The transparent member 20e is manufactured in this way: Resin material is preferably molded by a transfer-molding or an injection molding so that more formability and higher accuracy are obtained. The transparent member 20e may be made of glass so that changes in materials and shape of the member with time can be substantially reduced. As a result, a glass-made light-transparent member 20e increases its reliability.

It is preferable for the transparent member 20e to have a function of gathering and scattering the light emitted from light-emitting-elements 20a, 20b and 20c, because this function increases the light utilization factor. The structure of the transparent member 20e allows light to spread widely toward an area to be subjected to wider irradiation, and to narrow toward an area to be subjected to narrower irradiation, so that this structure can guide the light in a thin surface-lighting-device, among others, with high efficiency.

Figure 17:
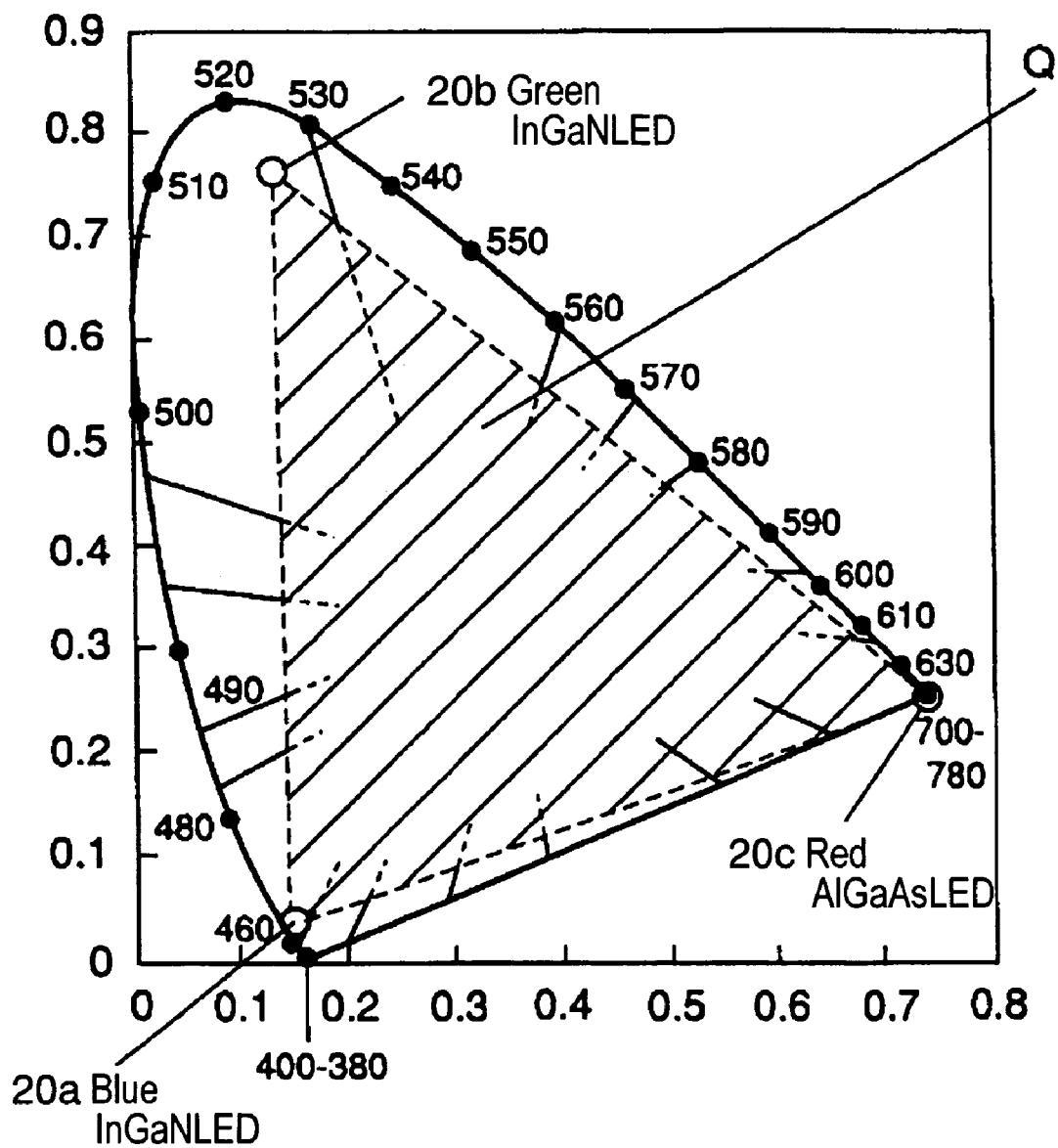
FIG. 17 is a CIExy color atlas in accordance with an exemplary embodiment of the present invention.

The chromaticity of light emitted from element 20a resides near the coordinates (x, y) (0.1, 0.04), that of element 20b resides near the coordinates (x, y)=(0.12, 0.76) and that of element 20c resides near the coordinates (x, y)=(0.72, 0.27) in CIExy color atlas. Therefore, controlling the respective currents of those elements makes the LED emit the color represented by "Q" section in CIExy color atlas shown in FIG. 17.

In FIG. 16, light-emitting-elements 20a, 20b and 20c included in LED 20 are roughly in the same shape. However, when each element is in a different shape or a dimensional center of the element is different from a light-emitting center, the elements are preferably arrayed so that the line connecting the light-emitting centers is approximately aligned with the longitudinal direction of the transparent member 20e. This arrangement allows respective lights from the elements 20a, 20b and 20c to be used approximately at the same utilization factor. This permits a user to have the flexibility of controlling light amount and colors. Further, the incident condition of the light from respective elements to light-guide-board 2 (described later) can be equal. As a result, disperses of incident-light amounts and incident-light axes among respective elements are minimized so that sufficient light and excellent color tones are obtainable in the surface lighting device.

Respective spaces between light-emitting-elements 20a, 20b and 20c are preferably as small as ranging from 0.3 to 1.0 mm thereby restraining unevenness in luminance and colors. If the space is less than 0.3 mm, it is too narrow for wire bonding, resulting in increasing a frequent occurrence of the short circuiting between respective terminals. This narrow space would result in a lower yield rate. On the contrary, if the space is wider than 1.0 mm, it is difficult to restrain the unevenness in luminance and colors due to different emitting positions of each element. More preferably, the space ranges 0.4–0.8 mm. With this space, thermal affect to the adjacent elements is minimized, and yet, unevenness in luminance and colors is restrained.

As such, two or more than two light-emitting-elements are employed in LED 20 of the surface lighting device, then a user can select or make a controller select element(s) to be emitted, e.g. change a light wavelength or vary a light amount of respective elements, thereby changing emitting colors of the surface lighting device. One of the plurality of elements can be kept for just in case of a element failure.

The plurality of light-emitting-elements disposed in LED 20 have different light wavelengths independently, and at least two elements emit simultaneously so that LED 20 can emit a different color from what each light wavelength of the elements originally disposed cannot express. In this case, uneven luminance due to different light wavelengths is minimized because of the narrow space between the elements, and a uniformed mix-color is obtainable. As a result, a surface lighting device free from uneven colors is achievable. This is an advantage over the case when a plurality of light sources having different light wavelengths are disposed with wider spaces in between and these light sources emit simultaneously.

In the description hereinafter, LED 1 can be replaced with LED 20 unless otherwise specified.

In FIG. 1, light-guide-board 2 made of transparent material guides the light from LED 1 and emits the light to outside from a given place. The material of board 2 is preferably highly transparent resin such as methacrylic resin, polycarbonate resin or the like. More specifically, transmittance per one (1) mm thickness is preferably not less than 95%. In the case of a resin board having a length not less than 30 mm, a material of which transmittance is not less than 98% is preferably used so that loss of light amount is minimized and thus greater luminance is obtainable. Resin or glass satisfies these conditions, and the resin, in particular, has more formability by an injection molding and is better for mass production. In this embodiment, methacrylic resin featuring a high light-transmittance is thus used. A refractive index of light guide board 2 is preferably not less than 1.3, and more preferably not less than 1.4. This condition allows the guided light to reflect totally with ease at an interface with an air layer (refractive index is approx. one (1)) so that light amount leaked out of light-guide board 2 can be restrained. As a result, loss of the light incident on light-guide-board 2 caused by emitting the light to outside can be minimized, and the light utilization factor is increased thereby lowering the power consumption of the surface lighting device.

Light guiding section 3 of light-guide-board 2 spreads the light emitted from LED 1 in the width direction of board 2 through incident plane 3a and reflecting plane 3b. The length of light-guiding-section 3 is preferably as short as possible because this short length allows the surface lighting device and an apparatus employing this device to be small in dimensions. More specifically, the length of not more than 8 mm is demanded by the market.

The light from LED 1 approaches incident plane 3a before the light reaches light-guiding-section 3. Incident plane 3a is not perpendicular to upper face 2a of light-guide-board 2. This structure restrains effectively the light of LED 1 from being transmitted across the transparent board of light-guiding-section 3, and thus guides more light to light-guide-board 2.

Reflecting plane 3b (a lateral face of board 2) reflects most of the incident light first of all. Plane 3b is slanted with respect to lateral face 2b of board 2. Slant angle θ (when the slope is formed with a curve, an angle of a slant connecting both the ends) may be wide enough, more specifically, the angle ranging between 90° and 135° allows the light to approach entire board 2 even board 2 has a wide width. Lately, in a portable terminal apparatus, a display section becomes wider, yet an apparatus per se becomes smaller. Therefore, slant angle θ is more preferably not less than 65° so that light-guiding-section 3 can be shorter yet light emitting section 4 can be larger. An angle formed by crossing reflecting planes 3b, i.e. an opening angle of light-guiding-section 3, is preferably not less than 90°, and more preferably not less than 130°. This structure allows the length of section 3 to be not more than 8 mm even if light emitting section 4 has a width (W2) of 16 mm. In other words, the length of light-guiding-section 3 can be reduced and yet the width of light-emitting-section 4 can be increased.

The shape of reflecting plane 3b may be flat or curve, depending on the luminance distribution of LED 1 and a shape of light-guide-board 2, and the shape of plane 3b is determined so that an optimum luminance distribution can be obtained on light-guide-board 2. Disposing reflecting plane 3b uniforms the distribution of the incident light on light emitting section 4 even if the length of light-guiding-section 3 is shortened. As a result, a surface lighting device having little unevenness in luminance and high visibility is achievable.

Figure 21:
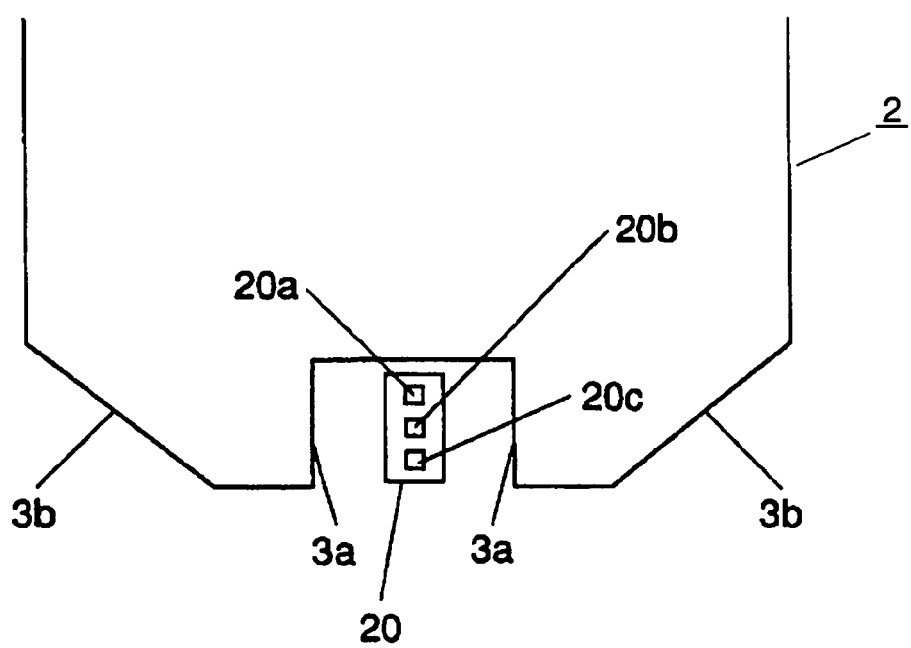
FIG. 21 illustrates positions of an LED having a plurality of light emitting elements and a light guiding section in accordance with an exemplary embodiment of the present invention.

When LED 20 replaces LED 1, light-emitting-elements 20a, 20b and 20c included in LED 20 are aligned on a line, i.e. an axial line, positioned approx. equidistantly between two incident planes 3a as shown in FIG. 21. This structure restrains an inconvenience of each element emitting different amounts of light incident on light-guiding-section 3, and uniforms the luminance distribution. As a result, a surface lighting device having high visibility and little unevenness in luminance is achievable.

This axial line is defined as a straight line connecting the most intensified points in the intensity distribution of LED light, or an approximating line of the same. If the light-intensity-distribution is different from Gauss distribution, and the light intensity is distributed diversely, the axis line is defined as a line vertical to emitting surfaces of the elements. Further, if the vertical line does not run through the emitting surfaces, the vertical line can be modified to run through the emitting surfaces. These definitions are applicable to the "axis line" hereinafter.

In FIG. 1, light-emitting-section 4 situated on light-guide-board 2 emits the light incident on board 2. When an average surface roughness of light-emitting-section 4 is not more than 1 μm, the light emitted is scarcely disturbed on an interface between emitting section 4 and air. A surface lighting device with high visibility is thus achievable.

In FIG. 2, scattering section 5 is formed on lower face 2c of light-guide-board 2, and reflects or transparently transmits the incident light in diverse directions. Scattering dots 5a are formed so that the dot area becomes greater at a longer distance from LED 1, and are formed with an ink ranging from milky-white to white. Dots 5a scatter the light incident thereon. In most cases, dots 5a are printed. Screen printing and pad printing among others are preferable because these methods can increase the productivity of manufacturing. Pad printing, in particular, can print scattering dots 5a uniformly even if the surface of light-guide-board is not flat.

Scattering dots 5a as structured above can produce excellent scattering of light and minimize light absorption into the dots. The distribution of the printed area of scattering dots 5a can be changed depending on the location, so that uniform luminance distribution of light-emitting-section 4 is achievable. The ink for the dots preferably employs transparent binder and white particles such as titanium oxide dispersed therein. Besides the white particles, glass beads having a refractive index greater than the binder or air bubbles can be mixed in the ink with the same effect.

Numbers of fine peaks or valleys formed directly on scattering section 5 by molding can function as scattering light, thereby replacing scattering dots 5a.

Reflecting layer 6 is placed beneath the lower face of scattering section 5 and has a high reflective rate. Reflecting layer 6 reflects parts of outgoing light transmitted through scattering section 5 and then emitted from light-guide-board 2, so that the light reflected returns inside the board 2 again. Reflective layer 6 is made of polyethylene tere-phtalate (PET) sheet or the like. A metal vacuum-deposited sheet or a foamed-sheet increases a reflection.

Reflecting layer 6 may be provided independently in a form of a separate member, or formed directly on light-guide-board 2 by printing or vacuum deposition in advance. This direct forming can simplify the manufacturing processes of the surface lighting devices, thereby increasing the productivity and lowering the manufacturing cost. A thin type surface lighting device is thus achievable.

When reflecting layer 6 is directly formed on light-guide-board 2, layer 6 may be formed only on scattering dots 5a and not formed in other area. This structure allows the light passing through dots 5a to reflect on layer 6 and other light to reflect totally inside light-guide-board 2. Thus the light is reliably guided to light-emitting-section 4.

When reflecting layer 6 is independently provided in a form of a different member, an air layer is provided between layer 6 and board 2 so that both of total internal reflection light of board 2 and reflection light on layer 6 can be utilized. As a result, a utilization factor of the light is increased. Layer 6 can be bonded to board 2 in parts following the given positional relation, thereby simplifying the assembly processes of the surface lighting device.

Reflecting layer 6 may be coupled to second recess 8c of holder 8 (detailed later) in advance. This structure eliminates an inconvenience at assembly of the surface lighting device. The inconvenience is this: Board 2 and layer 6 would be bonded with some slippage, which prevents second recess 8c from accommodating layer 6. As a result, this structure increases an yield rate of the surface lighting device.

A surface of holder 8 can replace reflecting layer 6, and reflects the light. This structure eliminates layer 6.

Scattering layer 7 is disposed on the upper face of light-emitting-section 4. When the light passes through layer 7, layer 7 scatters the light in diverse directions. Scattering layer 7 is made of textured PET sheet, but not limited to this material only. Layer 7 may be provided independently in a form of a separate member, or formed directly on light-guide-board 2 by printing or molding. This direct forming method can simplify the manufacturing processes of the surface lighting device thereby reducing a number of components. This structure increases the productivity and lowers the manufacturing cost of the surface lighting device, further, realizes a thin type surface lighting device.

When layer 7 is independently provided in a form of a separate material, total reflection on upper face 2a of board 2 allows the light to be guided to the inside of entire board 2, thereby reducing unbalance of light amount. In this case, layer 7 may be bonded to board 2 in advance following the given positional relation. This simplifies the assembly processes of the surface lighting device.

Holder 8 accommodates light-guide-board 2, reflecting layer 6 and scattering layer 7 at desired places. Holder 8 is made of one of various metals such as stainless steel, iron, or aluminum, or resin. Resin is preferable among other because of excellent formability, mass productivity and lightweight. Acrylonitrile-butadiene-styrene (ABS) resin, or poly-carbonate resin is a preferable material for holder 8. A color of these materials has preferably a high reflection factor such as white in order to return the light running out of board 2 from parts other than light-emitting-section 4 into board 2 again efficiently. When the material having a reflection factor of not less than 80% with respect to the wavelength of LED's emitting light is used, the light utilization factor is increased. As a result, necessary luminance is obtainable with less power. In this embodiment, the light from lateral face 2b of board 2 reflects on the inner face of holder 8. However, another reflecting plane can be provided onto this inner face. This reflecting plane is made of metal or dielectric material having a higher reflectance.

Holder 8 accommodates light-guide-board 2, reflecting layer 6 and scattering layer 7 at desired places. This accommodating function is detailed hereinafter.

In holder 8, first recess 8a, barrier plate 8b, second recess 8c, rib 8d, room 8e, barrier plate 8g and space 8i are formed.

First recess 8a accommodates light-guide-board 2. At least one part of the outer circumference of recess 8a engages with the outer wall of board 2, and functions as a position regulator for board 2 with respect to holder 8. A depth "h" of recess 8a is preferably greater than the thickness of board 2. This structure allows the light leaked from a lateral face of board 2 to reflect on a side face of recess 8a and then return to board 2 again. The light utilization factor is thus increased, and this increases the luminance of the surface lighting device.

Second recess 8c accommodates reflecting layer 6, and is formed by further depressing a part of bottom face of first recess 8a. The depth of second recess 8c is greater than the thickness of layer 6.

Barrier plate 8b is disposed between room 8e and first recess 8a in a thickness direction of board 2. Barrier plate 8b prevents most of the light from LED 1 from entering into board 2 directly, in particular, to the board center and its neighbor adjacent to LED 1. Barrier plate 8 restrains a light-emitting-section (section C) near to LED 1 from illuminating outstandingly comparing with other areas. This structure allows the surface lighting device to distribute luminance more evenly and effect better visibility. Plate 8b is preferably unitarily molded with holder 8, and this increases the mass-productivity. This unitary molding can eliminate a step of aligning the light from LED 1 with plate 8b, a step of aligning plate 8b and holder 8 and a step of bonding. As a result, the productivity of manufacturing the surface lighting device is increased, and its yield rate is improved. In this embodiment, barrier plate 8b is made to be a shielding plate; however, it is not necessary to use a perfect shielding plate, and the shielding plate may be slit or perforated. Plate 8b is not always unitarily molded with holder 8.

Barrier plate 8g is disposed approx. in parallel with inner surface of board 2 from the top of panel 8b on the emitting side of emitting section 4 to the top of rib 8d on the same side. Panel 8g reflects the light emitted from LED 1 and discharged upwardly and enters the light into board 2 finally. In this embodiment, plates 8g, 8b and holder 8 are unitarily molded.

Barrier plate 8g efficiently guides the light emitted upward of LED 1 into guide board 2, and discharges this upward light directly outside the surface lighting device. This structure prevents the light from leaking out of sections otherwise not to illuminate.

The width of plate 8g (shown in FIG. 2) approx. equals the distance between two incident planes 3a (shown in FIG. 1) so that gap 10 between plate 8g and board 2 can be almost eliminated. As a result, leakage light from this gap is minimized.

Respective inner faces of plates 8b and 8g are flat with respect to LED 1 in this embodiment; however, if the inner faces are protruded toward LED 1, these inner faces reflect the light from LED 1 in wider reflection angles, so that the light is guided efficiently into board 2.

Ribs 8d reinforce holder 8 and increase the mechanical strength of holder 8. Further, rib 8d reflects at least parts of scattering light from LED 1 on its side face so that it can guide a part of light (not guided directly into light-guiding-section 3) into guiding section 3 indirectly. This structure increases the utilization factor of the light emitted from LED 1, thereby realizing a surface lighting device with sufficient luminance with less power.

In room 8e where the light emitted from LED 1 travels before the light reaches incident plane 3a, the light is scattered by dust and the like, so that the light amount guided to light-guiding-section 3 is reduced. Ribs 8d preferably have approx. the same height so that end faces 8f thereof can closely fit a substrate (not shown) to be disposed under ribs 8d. This structure reduces amount of dust invading into room 8e so that the light amount scattered by the dust and not entering in guiding section 3 can be reduced. As a result, the light utilization factor is increased.

Space 8i prevents components mounted on the circuit board (not shown) from touching the surface lighting device. Space 8i allows the circuit board to widen components-mountable areas.

This structure, i.e. holder 8 accommodating light-guide-board 2, reflecting layer 6 and the like, allows the surface lighting device to be thinner, which meets users' request.

Several methods of assembling board 2, layers 6 and 7 into holder 8 are available as follows:

(a) Bond board 2, layers 6 and 7 at a given positional relation, then incorporate this sub-assembly into holder 8.

(b) Form reflecting layer 6 and scattering layer 7 on the surface of board 2 by printing or vacuum deposition, then incorporate board 2 into holder 8.

(c) Accommodate separate layer 6 into second recess 8c of holder 8, then incorporate board 2 on which layer 7 has been bonded or formed into holder 8.

(d) Accommodate layer 6 into second recess 8c of holder 8, then incorporate board 2 into first recess 8a, and finally, bond layer 7 onto a given position on board 2.

According to method (a), two processes, i.e. one is assembly of board 2, layers 6 and 7, the other is assembly of a surface lighting device, can be carried out parallel before holder 8 is incorporated. This simplifies the total assembly of the surface lighting device and increases the manufacturing productivity.

According to method (b), a number of components can be reduced efficiently, and thus a number of steps or assembly lines can be reduced. The manufacturing productivity is thus further improved.

According to method (c), layer 6 is situated in second recess 8c reliably, so that defectives due to the slippage between layer 6 and recess 8c can be restrained. The yield rate of the surface lighting devices is thus improved.

An operation of the surface lighting device in accordance with this embodiment is demonstrated hereinafter.

Some light out of the light emitted from LED 1 reaches barrier plate 8b of holder 8. Being blocked by barrier plate 8, this light is not input directly to the light-guiding-section 3 but is reflected on plate 8b. Other light arriving at barrier plate 8g is blocked by plate 8g, and is not emitted directly outside the device but reflected on plate 8g. A part of the light reflected on plates 8b and 8g approaches incident plate 3a and enters into light-guiding-section 3, and then this light is reflected on reflecting plate 3b before entering light-guide-board 2. This incident light is emitted directly from light-emitting-section 4 or indirectly through scattering section 5 and reflecting layer 6.

On the other hand, some other light emitted from LED 1 not striking plates 8b and 8g mostly enters into board 2 through incident plate 3a. This incident light travels through guiding section 3 and strikes reflecting plate 3b, which reflects this light to light-emitting-section 4 and scattering section 5. Parts of this light is irradiated from section 4, and other part of this light is reflected irregularly on scattering dots 5a then irradiated from emitting section 4. Another part of this light travels through scattering section 5. Then reflecting layer 6 reflects and returns the light into board 2 again, and finally, the light is irradiated from emitting section 4.

The light irradiated from light-emitting-section 4 travels in scattering layer 7 and scatters in diverse direction. Without scattering layer 7, a pattern of dots 5a would be distinctly recognizable by human eyes; however, disposing dots 5a veils the dot pattern not recognizably.

As discussed above, providing barrier plate 8b changes the distribution of light emitted from LED 1, so that the luminance at section C near LED 1 is prevented from increasing outstandingly. As a result, uniform luminance is obtained.

Several samples of surface lighting device are produced for evaluating the visibility in order to realize a small surface lighting device featuring high visibility, i.e. few recognition errors. Various conditions are applied to these samples. Each sample comprises one single LED and a short length of light-guiding-section 3 yet producing an excellent luminance distribution.

In the first sample, the following conditions are evaluated:

1. An area of light-emitting-section 4 per LED is not less than 500 mm², and a distance between LED 1 and section 4 is not more than 8 mm. Further, a ratio of maximum luminance vs. minimum luminance at section 4 is not less than 0.3. When these conditions are satisfied, the surface lighting device, in general, provides a clear display with excellent visibility.

2. In addition to the above conditions, when the above ratio is further focused to not less than 0.4, the device can provide a clear display free from uneven luminance. As a result, the ratio should be set at not less than 0.3 and preferably not less than 0.4, so that the surface lighting device can provide efficiently a clear display free from problems of LCD visibility.

In the second sample, a relation between an average luminance of emitting-section 4 and visibility is evaluated with the following conditions:

Light emitting area per LED is not less than 500 mm², and the distance from LED 1 to light-emitting-section 4 is not more than 8 mm. In the second sample satisfying the condition discussed above, an average luminance of emitting section 4 is varied. The result is this: When the average luminance is less than 1 cd/m², the device provides a significantly dark display. In the case of not less than 1 cd/m², the device provides a display that users can recognize the content of the display even in a dark place. When the average luminance is raised to not less than 3 cd/m², the device can provide a clear and easy-to-see display. However, when it exceeds 200 cd/m², the device makes a display too much bright and not easy-to-see. Therefore, the average luminance of light-emitting-section 4 desirably ranges between 1 cd/m² and 200 cd/m² so that the surface lighting device can provide an LCD at ambient condition for human eyes.

In the third sample, a relation between a change rate in luminance and recognizable uneven luminance is evaluated with the following conditions:

Light emitting area per LED is not less than 500 mm², and the distance from LED 1 to light-emitting-section 4 is not more than 8 mm. In the third sample satisfying the condition discussed above, a rate of luminance change is varied. The result is this: When a luminance change per unit length is at any value not more than the value of (average luminance)× 100 cd/m³, the sample produces a little uneven luminance. Further, at any value not more than the value of (average luminance)×80 cd/m³, the sample scarcely produces uneven luminance. Therefore, a luminance change per unit length is desirably at any value not more than the value of (average luminance)×100 cd/m³, and more preferably, the change is at any value not more than the value of (average luminance)×80 cd/m³. This adjustment allows the surface lighting device to be efficient and free from recognizable uneven luminance, thereby realizing a clear and easy-to-see surface lighting device.

In the fourth sample, a relation between a half width of the light wavelength of the LED and clearness of the display is evaluated with the following conditions:

Light emitting area per LED is not less than 500 mm², and the distance from LED 1 to light-emitting-section 4 is not more than 8 mm. In the fourth sample satisfying the condition discussed above, a half width of the light wavelength of LED 1 is varied. The result is this: When the half width is not less than 50 nano-meter, the sample makes a display not clear and vague. When the half width is not more than 50 nano-meter, the sample makes the display rather clear and recognizable. When the half width is further shortened down to not more than 40 nano-meter, the sample makes the display clear and crisp for human eyes. If a portable terminal employs such a surface lighting device, users can see clear and crisp display and catch information exactly.

In the fifth sample, emitting efficiency of the LED on the main optical axis is evaluated with the following conditions:

Light emitting area per LED is not less than 500 mm², and the distance from LED 1 to light-emitting-section 4 is not more than 8 mm. In the fifth sample satisfying the condition discussed above, emitting efficiency of the LED on the optical axis is evaluated with respect to an easy-to-see display. When emitting efficiency is not less than 1.0 cd/A, the sample can realize the average luminance of 1 cd/m². This contributes substantially to power saving of the portable apparatus.

The factors obtained from the five evaluations discussed above are combined, and a surface lighting device satisfying these combined factors is produced in order to realize less-powered, more easy-to-see, and eye-friendly device.

In the case of using plural LEDs, each LED desirably satisfies those five factors so that a surface lighting device can produce an easy-to-see and eye-friendly display with less power upon lighting any LEDs.

Exemplary Embodiment 2

The second exemplary embodiment is demonstrated hereinafter with reference to FIG. 6 and FIG. 7.

Figure 6:
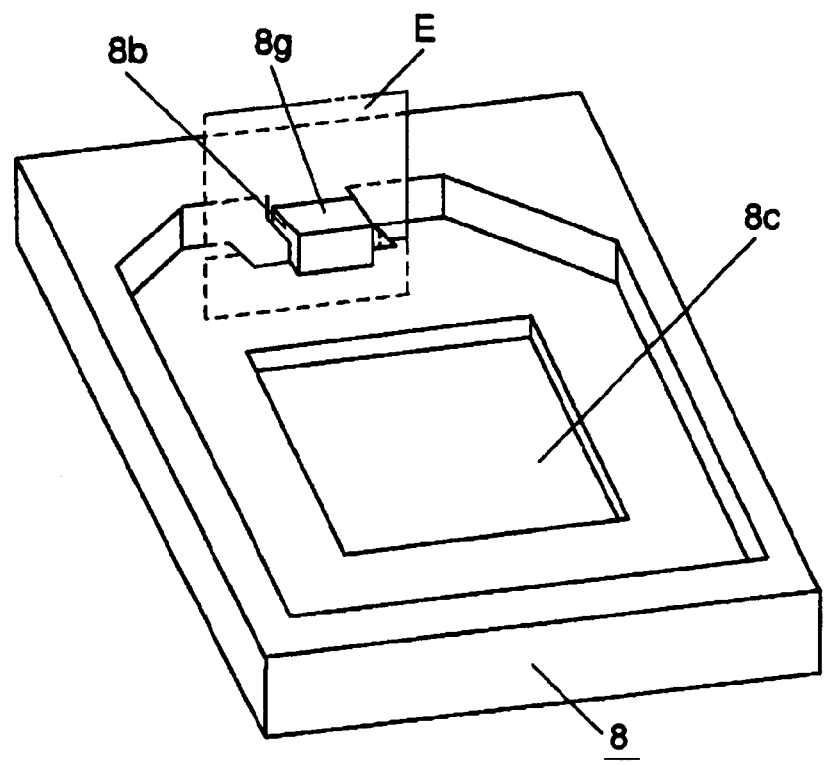
FIG. 6 is a perspective view of a holder in accordance with a second exemplary embodiment of the present invention.

FIG. 6 is a perspective view of a holder of a surface lighting device in accordance of the second embodiment of the present invention. FIG. 7 is a cross sectional view of barrier plate 8g of the same, taken along cross section E expressed with broken line in FIG. 6.

Figure 7:
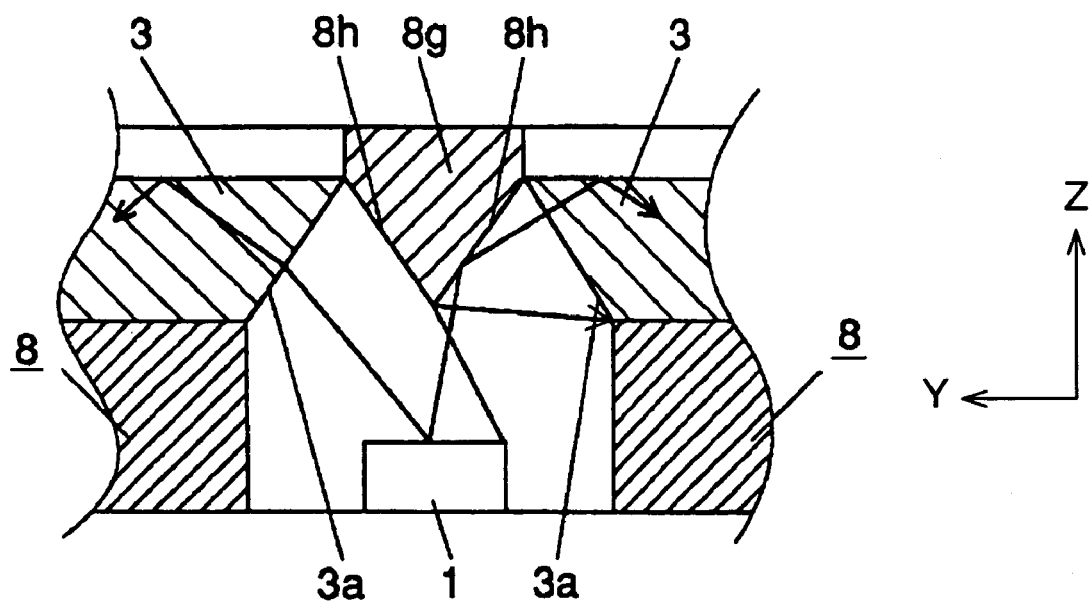
FIG. 7 is a cross section of a neighbor of a barrier plate in accordance with the second exemplary embodiment of the present invention.

In FIG. 7, reflecting plate 8h is an inner face of barrier plate 8g on LED 1 side, and formed by approx. V-shaped plate. Reflecting plate 8h changes a traveling direction of almost all the light emitted upwardly from LED 1 to the direction of reflecting plate 3b shown in FIG. 1. Reflecting plate 8h guides most of the light emitted from LED 1 to light-guide-board 2, thereby increasing utilization factor of the light. In this case, the light widens its ray-bundle substantially before entering into light-emitting-section 4, compared with the case when the light from LED 1 is directly guided into board 2. Therefore, this structure allows the distribution of light incident on emitting section 4 to be more even, and minimizes unevenness in luminance of the light emitted from section 4.

When LED 1 produces symmetrical light-intensity-distribution, a vertex or ridge line of the V-shaped plate of reflecting plate 8h is arranged to be on an extended axial line of LED1 so that plate 8h reflects approx. equivalent light-amount on either slope of V-shaped plate. This structure allows light-emitting-section 4 to reduce the luminance distribution, and realizes a easy-to-see surface lighting device.

LED 20 shown in FIG. 16 has a plurality of light emitting elements 20a, 20b and 20c aligned. In this case, a straight line connecting respective emitting centers of the elements (hereinafter referred to as LED-center-line) and the ridge line of the V-shaped panel of plate 8h viewed from top form an angle not more than ±10° or preferably approx. 0° so that a better luminance distribution is produced. The LED-center-line can be an approximate line thereto. When light wavelength of the light reflected on V-shaped plate 8h and guided to reflecting plate 3b loses balance on either side (or upper and lower sides), luminance distribution becomes unfavorable. The structure discussed above can restrains uneven colors produced by emitting plurality of light-emitting-elements simultaneously. The uneven colors, in this case, show fine differences in colors in every direction.

Respective lengths of axial-lines from elements 20a, 20b, 20c to reflecting panel 8h are approx. equal so that the light-distribution becomes more uniform. As a result, a surface lighting device featuring less unevenness in both luminance and colors as well as high visibility is achievable.

Meanwhile, a display unit utilizing the unbalance of light wavelengths (e.g. a rainbow colored display unit) does not need the structure discussed above.

When LED 1 produces an asymmetric light-intensity distribution, the areas of V-shaped plates forming reflecting plate 8h are varied corresponding to the asymmetric distribution so that the reflected light amounts on both sides can be approx. equal. As a result, a surface lighting device featuring a small luminance distribution at the light-emitting-section and easy-to-see operation is achievable. The areas of V-shaped planes can be varied intentionally so that a luminance distribution at emitting section 4 can be modified.

Incident plane 3a is preferably slanted toward LED 1 and reflecting plane 8h so that the light directly entering into light-guiding-section 3 and the light entering via plane 8h (both the lights emit from LED 1) are efficiently entered into light-guide-board 2.

The angle formed by the V-shaped planes is determined based on the following factors so that the light utilization factor can be increased: (1) the distance between LED 1 and plane 8h, (2) the distance between plane 8h and incident plane 3a and (3) the thickness of board 2.

Other parts have approx. the same constructions as described in the first embodiment.

In this second embodiment, approx. V-shaped reflecting plane 8h is formed on barrier plate 8g; however, the same V-shaped reflecting plane may be formed also on the inner face of barrier plate 8d on LED 1 side. This further increases the light amount entering into board 2. A cross section of plane 8h can be U-shaped or any other shapes which maximizes the light amount entering incident plane 3a.

An operation of the surface lighting device discussed above is demonstrated hereinafter. The light emitted from LED 1 toward barrier plate 8g (in direction Z shown in FIG. 7) rarely arrives directly at guiding section 3, but most of the light arrives at reflecting plane 8h. Most of the light reflected and changed in travelling direction from Z to Y (shown in FIG. 7) by plane 8h enters incident plane 3a. On the other hand, parts of the light emitted from LED 1 enters directly into light-guide-board 2 through incident plate 3a. As such, the light incident on board 2 is reflected on plane 3b in the direction represented by X shown in FIG. 1, then emitted from light-emitting-section 4.

In the second embodiment as discussed above, reflecting plane 8h formed by approx. V-shaped plates is provided, thereby reflecting and expanding the light emitted in direction Z in direction Y. Then the light travels in direction X. This structure guides efficiently the light emitted upwardly (toward barrier plate 8g) from LED 1 to light-guiding-section 3. This upward light has been rarely utilized in the first embodiment. This structure thus substantially increases the light utilization factor, and realizes an efficient surface lighting device with less power consumption. In addition, this structure allows the light incident on light-emitting-section 4 to be more uniform, so that a highly visible surface-lighting-device with less uneven luminance is achievable. In the most cases of this structure, the light emitted from LED 1 or LED 20 travels along X, Y, Z axes.

Figure 8:
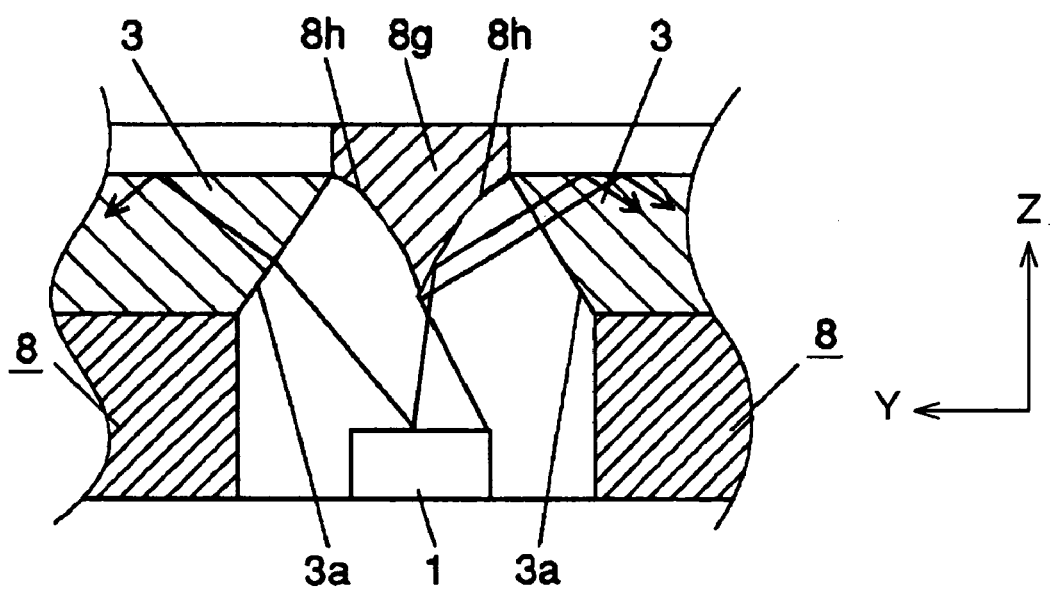
FIG. 8 is a cross section of a neighbor of a barrier plate in accordance with the third exemplary embodiment of the present invention.

Reflecting plane 8h can be structured as shown in FIG. 8, which is a cross section of neighbors of barrier plate 8g in accordance with the second embodiment. In FIG. 8, reflecting plane 8h is recessed into concave. This concave face not only reflects the light scattered from LED 1 but also narrows the scattering angle. Reflecting plate 8h thus converges the incident light and changes a travelling direction. This concave reflecting plate 8h further efficiently guides the light emitted upwardly from LED 1 into light-guiding section 3 than the structure discussed previously in this embodiment, thereby improving an efficiency of the surface lighting device.

Figure 9:
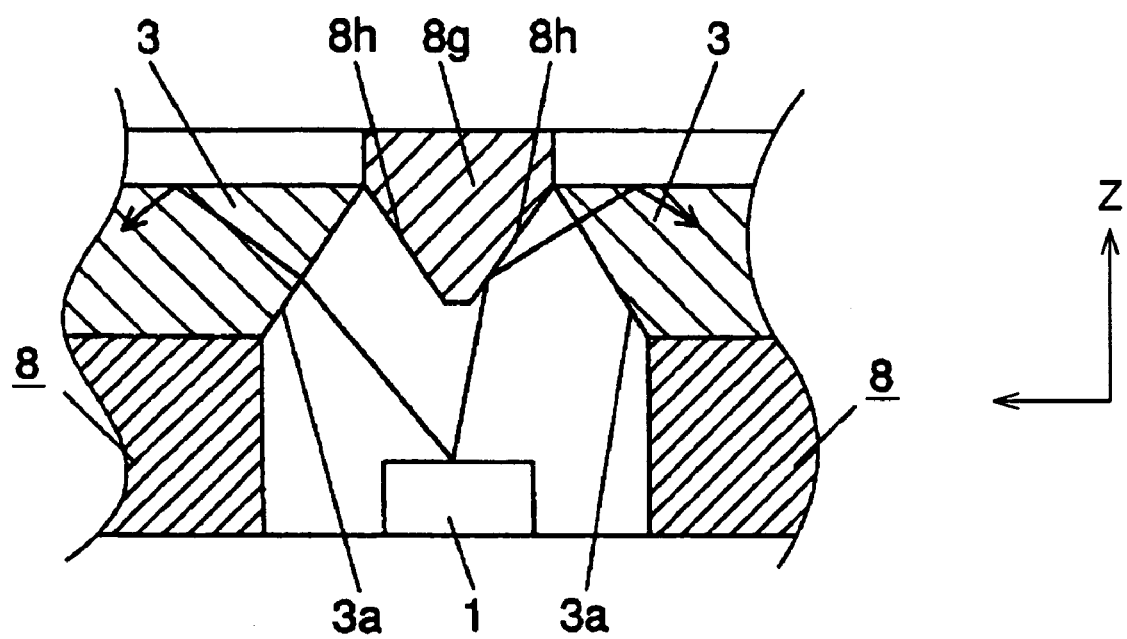
FIG. 9 is a cross section of a neighbor of a barrier plate in accordance with the fourth exemplary embodiment of the present invention.

Reflecting plane 8h can be structured as shown in FIG. 9. FIG. 9 is a cross section of neighbors of another barrier plate 8g in accordance with this embodiment. The surrounding area of vertex or ridge line of reflecting plane 8h shown in FIGS. 7 and 8 forms a sharp acute angle, so that the area is fragile by being hit with other members. The area just above LED 1 illuminates outstandingly than other areas. This would cause a large difference in light amount striking the two slopes of reflecting plate 8h if the relative positional relation between LED 1 and plate 8h is deviated due to manufacturing disperse of the surface lighting devices. This difference in light amount produces uneven luminance at light-emitting-section 4. Reflecting plate 8h shown in FIG. 9, on the other hand, a sharp section is cut away and "would-be-vertex" or "would-be-ridge-line" of V-shaped plate is now round form. This structure prevents the light just above LED 1 from striking directly the slopes of plate 8h. As a result, this structure indeed lowers the light utilization factor a little, but minimizes uneven luminance at light-emitting section 4.

Exemplary Embodiment 3

Figure 10:
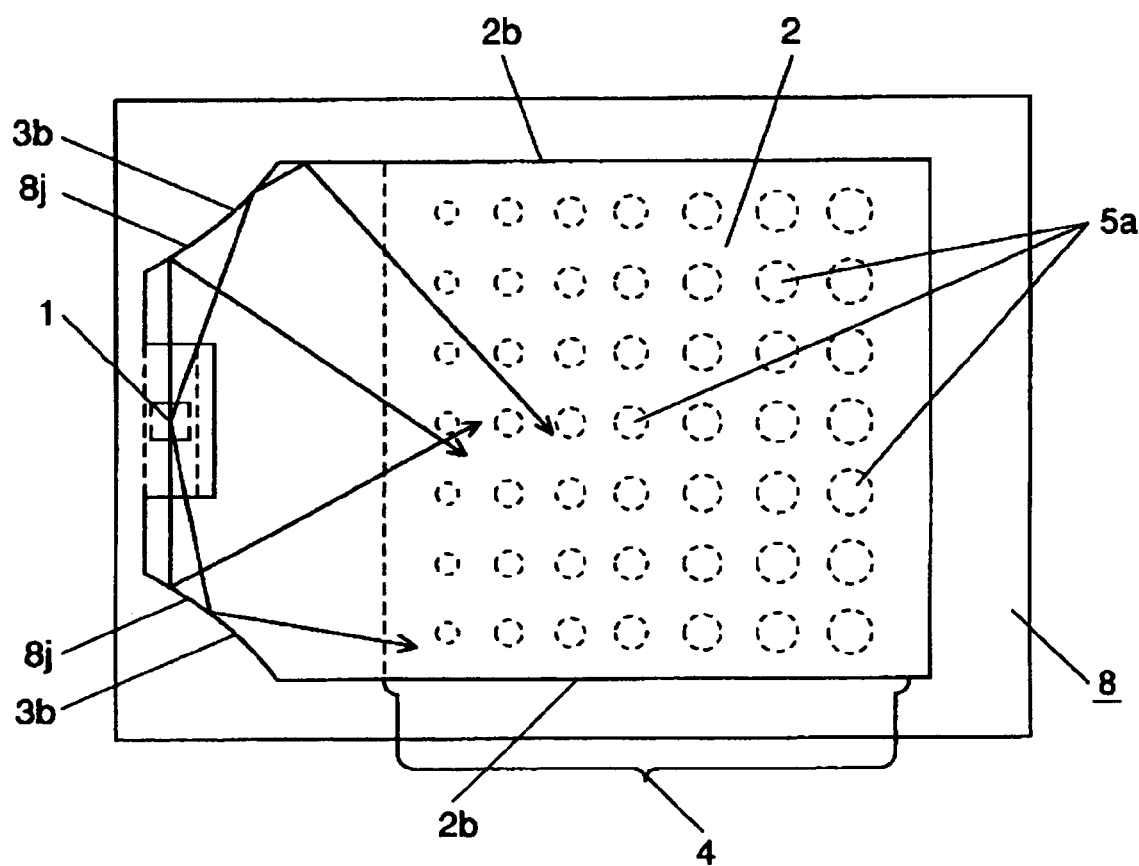
FIG. 10 is a plan view of a surface lighting device in accordance with the fourth exemplary embodiment of the present invention.

The third exemplary embodiment of the present invention is demonstrated hereinafter with reference to FIG. 10, which is a plan view of a surface lighting device in accordance with the third embodiment. As shown in FIG. 10, reflecting plate 3b forms convex, and fitting sections of holder 8 also form concave faces in order to fit form of plate 3b. In this structure, the light emitted from LED 1 approaches incident plane 3a and enters into light-guide-board 2 directly, or indirectly via barrier plate 8b and reflecting plane 8h. The incident light travels through light-guiding-section 3 and strikes reflecting plane 3b. Convex reflecting plane 3b scatters the light inside of guiding section 3, and the light travels to scattering section 5 by being reflected and scattered with the inner face of holder 8. Convex reflecting plane 3b scatters the light, thereby uniforms luminance at light-emitting section 4. The curvature of reflecting plane 3b is preferably changed responding to an intensity-distribution of the light emitted from LED 1 and entering to plane 3b. In other words, the curvature decreases at a stronger intensity thereby scattering the light in a wider angle, and the curvature increases at a weaker intensity thereby restraining the light from scattering. This structure is obtainable with ease by designing the mold. This third embodiment can uniform the luminance.

Exemplary Embodiment 4

Figure 18:
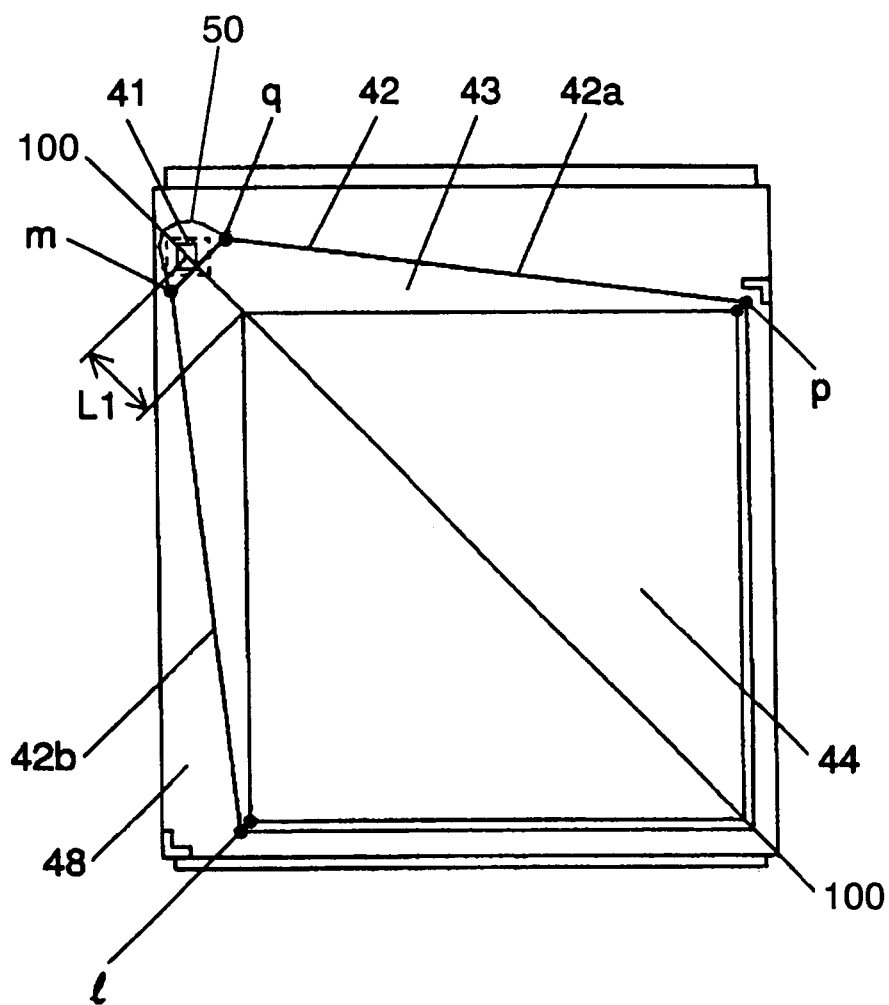
FIG. 18 is a front view of a surface lighting device in accordance with an exemplary embodiment of the present invention.
Figure 19:
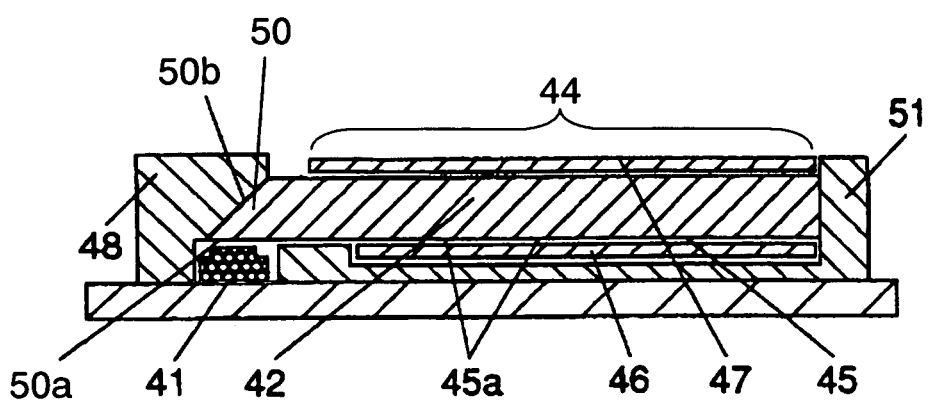
FIG. 19 is a cross section of a surface lighting device in accordance with an exemplary embodiment of the present invention.
Figure 20:
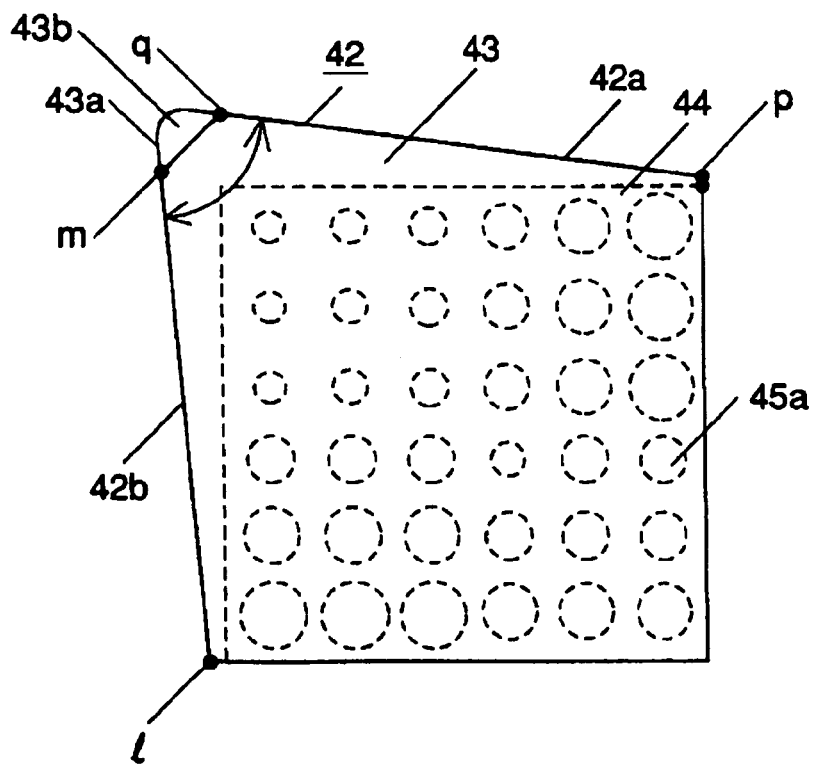
FIG. 20 is a front view of a light guide board in accordance with an exemplary embodiment of the present invention.

FIG. 18 is a front view of a surface lighting device in accordance with the fourth exemplary embodiment. FIG. 19 is a cross section of the same device taken along line 100—100 of FIG. 18. FIG. 20 is a front view of a light-guide-board used in this embodiment.

In FIG. 18, the surface lighting device comprises LED 41 and light-guide-board 42. Board 42 includes light-inlet 50, light-guiding section 43 and light-emitting section 44. LED 41 is approx. the same as LED 1 or LED 21 discussed in previous embodiments.

In FIG. 20, dotted line defines a border between light-guiding section 43 and light-emitting section 44. Given corners and ends of light-guide board 42 are expressed with "m", "q", "p" and "l". Light inlet 50 includes incident plane 50a which introduces the light from LED 41 into board 42, and reflecting plane 50b in FIG. 19 which reflects the light from incident plane 50a toward light-emitting section 44. Light inlet 50 widens from ends "q" and "m" of Board 42 toward corners "p" and "l" and forms V-shape. Light-emitting section 44 emits the light incident on upper face of board 42. Scattering dots 45a increases their areas at a greater distance from LED 41 as shown in FIG. 20.

In FIG. 19, scattering section 45 is formed beneath the lower face of board 42. Reflecting layer 46 is made of highly reflective material and is disposed beneath scattering layer 45. Reflecting layer 46 returns the light traveling through scattering section 45 and running out of board 42 to board 42 again.

Scattering layer 47 is disposed on light-emitting section 44. Holder 48 accommodates board 42, reflecting layer 46 and scattering layer 47 at desirable places. The functions of respective sections and the methods of forming them are the same as discussed in the first embodiment.

An operation of the surface lighting device as structured above is demonstrated hereinafter. First, the light from LED 41 enters to incident plane 50a. Then the light is reflected on reflecting plane 50b, and most of the light has an angle component satisfying conditions of total reflection at an interface between board 42 and air, so that this light is guided inside the board 42. Parts of the light incident on board 42 is reflected on light-guiding section 43, then guided toward light-emitting section 44. A part of the light is directly guided to section 44. In light-emitting section 44, the light guided by guiding-section 43 is totally reflected and shielded efficiently; however, the light striking scattering dots 45a on the lower face of section 44 is reflected in diverse directions or travels through. Only the light having an angle smaller than the critical angle at the total reflection runs out of board 42. Some light out of this light arrives at emitting section 44, and then is emitted. Some other light strikes reflecting layer 46 and holder 48, and then is reflected and returned inside board 42 again. As such, almost all the light, except some amount absorbed on the way, guided inside board 42 is emitted from section 44 for surface lighting.

In this structure, LED 41 is disposed at the corner of board 42 so that only the high intensity light out of the light from LED 41 can be guided to board 42. This structure thus scarcely produces dark portions which have been seen sometimes in a conventional devices, and uniforms the emitting characteristics. Further, this structure allows the distance between LED 41 and board 42 to be shorter, and this contributes to downsizing of the surface lighting device.

Figure 22:
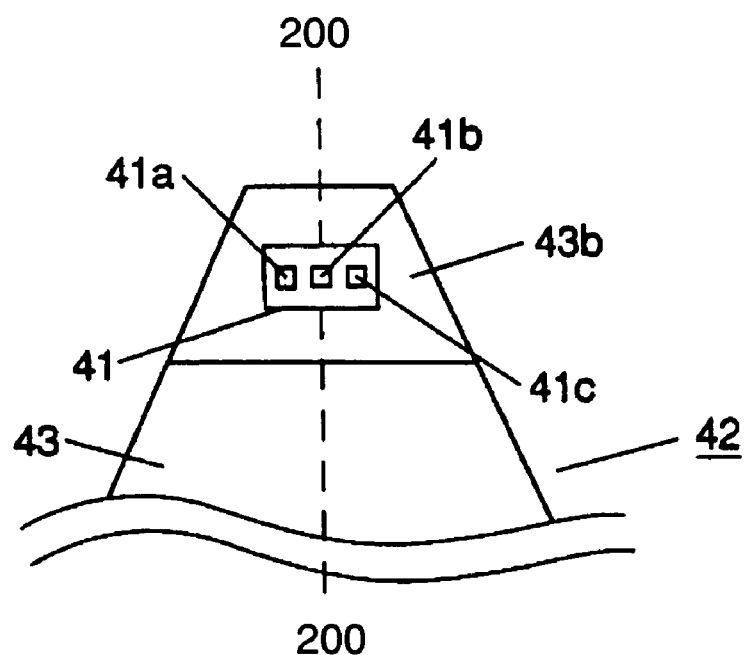
FIG. 22 illustrates positions of an LED having a plurality of LEDs and a light guiding section in accordance with an exemplary embodiment of the present invention.
Figure 23:
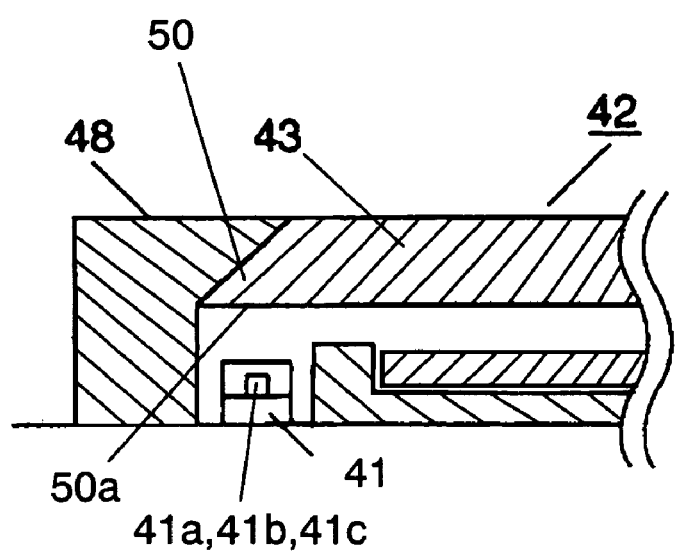
FIG. 23 is a cross section of neighbor of an LED in accordance with an exemplary embodiment of the present invention.

In the case of LED 41 replacing LED 20 having a plurality of light emitting elements, the placement of LED 41 is demonstrated with reference to FIG. 22 and FIG. 23. FIG. 22 shows the placement of the LED having a plurality of light emitting elements discussed in the first embodiment and the light guide board. FIG. 23 is a cross section of neighbors of the LED, in accordance with this third embodiment, taken along line 200—200 of FIG. 22.

In FIG. 22, LED 41 is placed so that an angle formed by an emitting center line of LED 41a, 41b and 41c and a diagonal line 200—200 of board 42 approximates to 90° or preferably almost 90°. The line 200—200 runs in the most longitudinal direction viewed from the LED. This structure allows the lengths of axial lines from respective LEDs 41a, 41b and 41c to light-inlet 50, incident plane 50a or reflecting plane 50b to approx. equal with each other. Thus the incident conditions from respective elements 41a, 41b and 41c become uniform.

When the emitting center line makes right angles with the diagonal line, uneven luminance can be restrained most efficiently. When an emitting face of the surface lighting device forms a quadrilateral having longer sides and shorter sides, such as a rectangle, the emitting center line forms a wider angle with the longer side direction of the rectangular than the angle formed with the shorter side direction, so that the advantages discussed above are obtainable. When light-emitting-section 44 forms a shape in which it is difficult to define a diagonal line, longer side or shorter side, LED 41 is placed as follows so that the advantages discussed above are obtainable: (1) a straight line between the farthest emitting face 44 from LED 41 and an emitting point of LED 41 (or an emitting center) forms right angles with the emitting center line of LED 41, or (2) a straight line forming approx. right angles with the emitting center line of LED 41 splits light-emitting-face 44 into approx. two equal parts.

In this fourth embodiment, the emitting center line forms approx. right angles with the diagonal line so that respective axial lines from elements 41a, 41b and 41c in LED 41 to reflecting plane 50b have the same length. However, for instance, the heights of elements 41a, 41b and 41c are varied (e.g. they form steps, they are disposed on a slope, or they have different heights per se). Then respective emitted lights enter reflecting plane 50b. The incident angles or the length of axial lines equal with each other, so that the same advantages are expected. This structure has less restrictions on the relative placement of LED 41 and light-guide-board 42 than other structures and produces more designing flexibility.

Exemplary Embodiment 5

The surface lighting devices described in the previous embodiments are employed in various electronic apparatuses, and the devices are used in numbers of portable terminals. In this embodiment, a portable terminal using the surface lighting devices is demonstrated.

Figure 11:
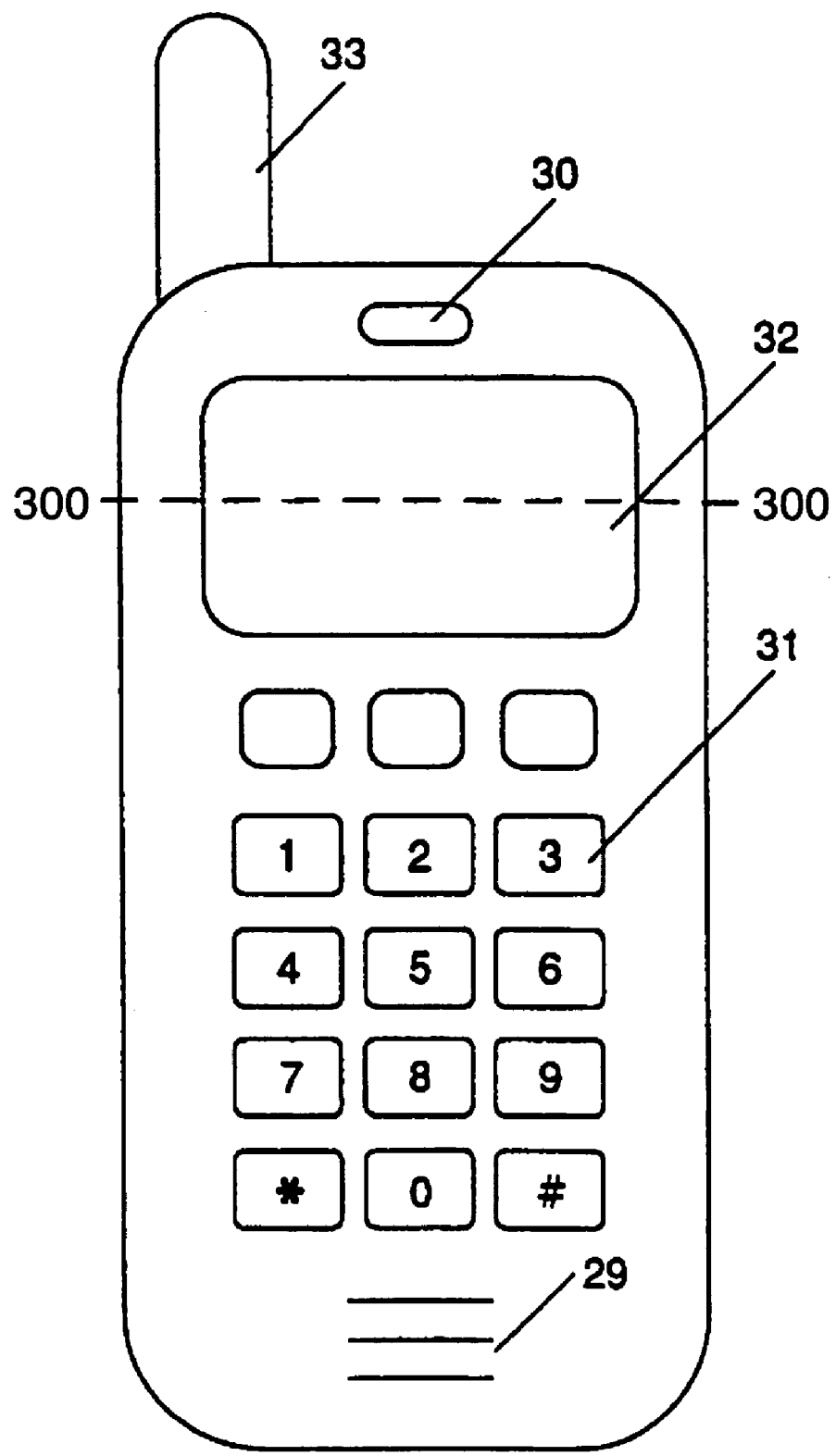
FIG. 11 is a plan view of a portable terminal in accordance with an exemplary embodiment of the present invention.
Figure 12:
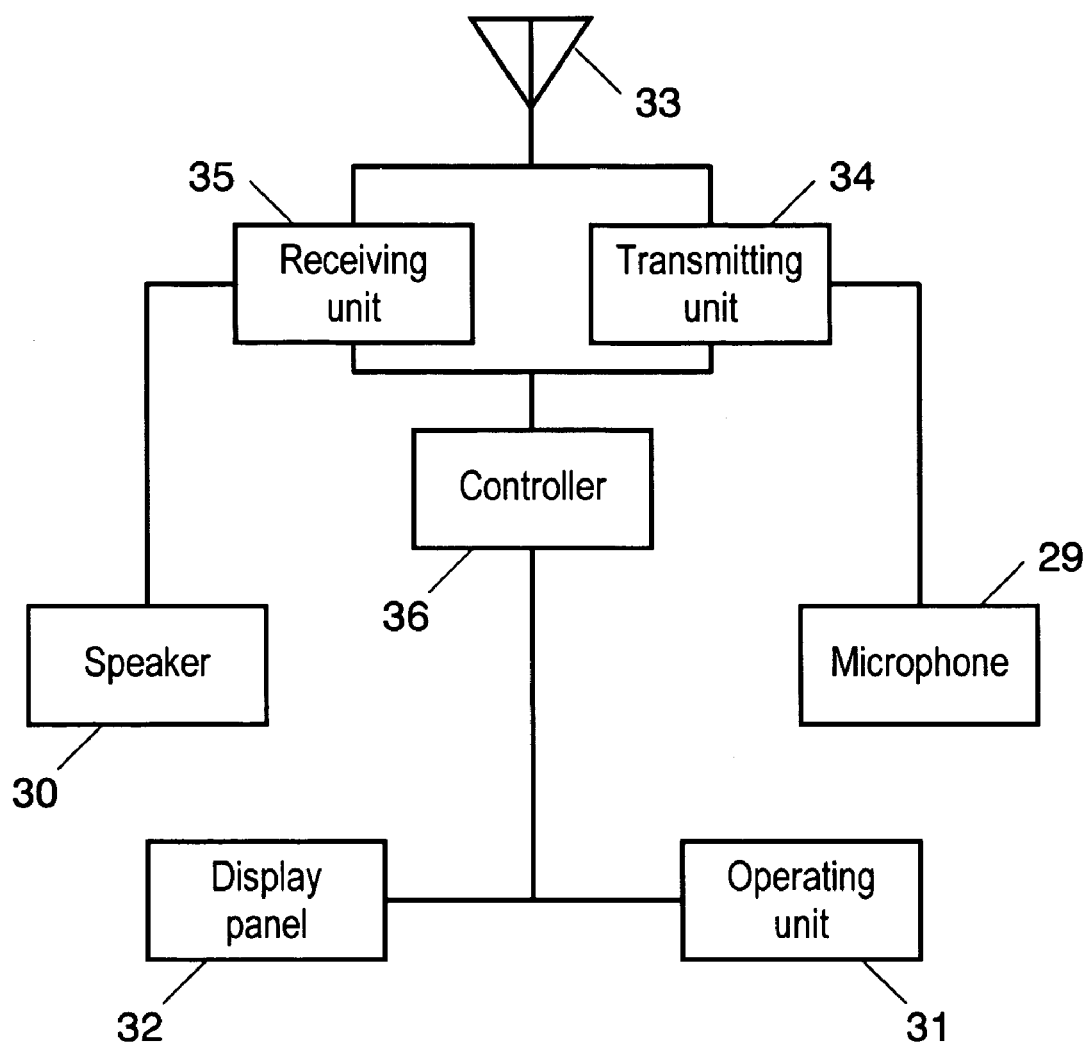
FIG. 12 is a block diagram of a portable terminal in accordance with an exemplary embodiment of the present invention.
Figure 13:
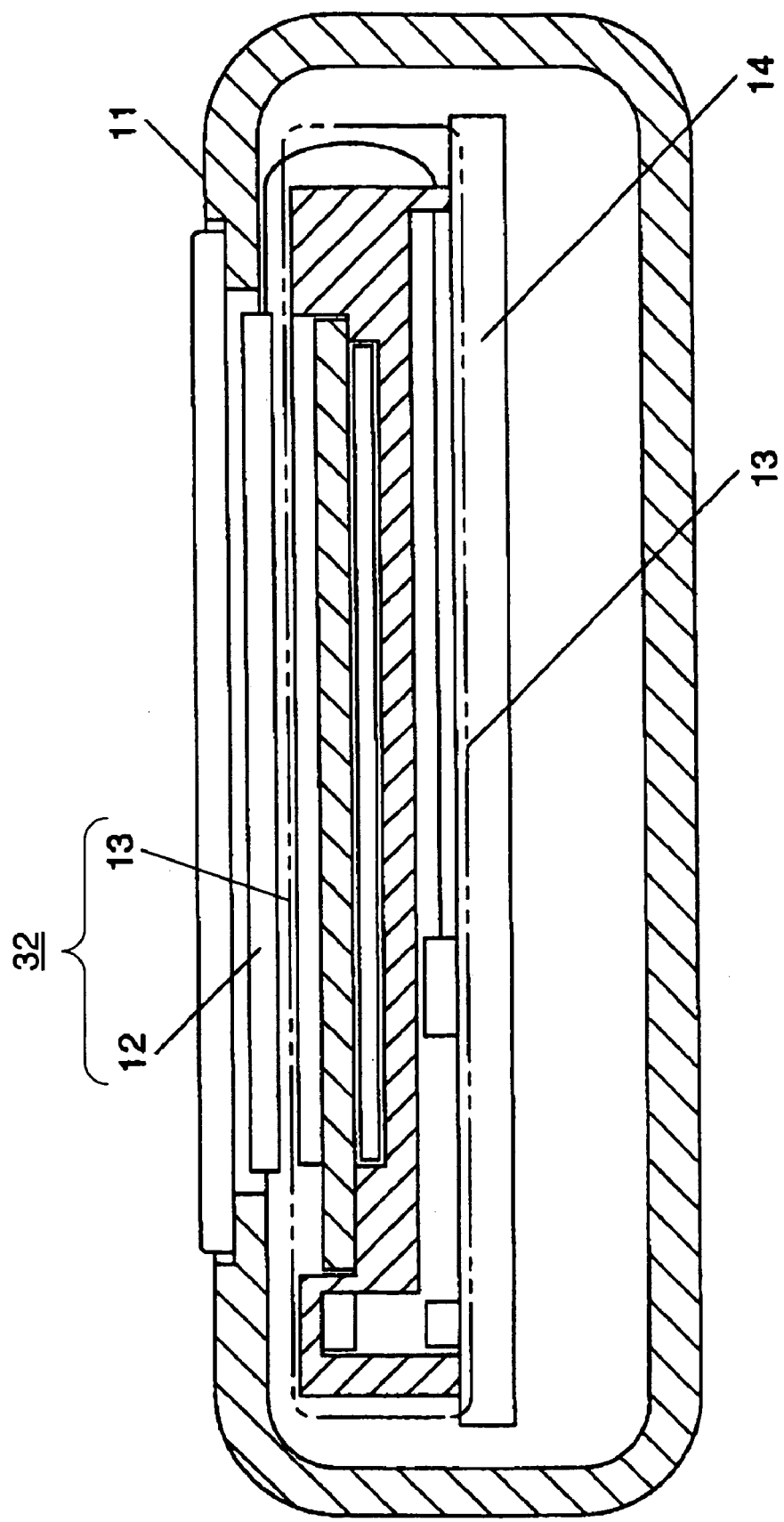
FIG. 13 is a partial cross section of a portable terminal in accordance with an exemplary embodiment of the present invention.

FIG. 11 and FIG. 12 are a plan view and a block diagram of a portable terminal in accordance with the fifth exemplary embodiment. FIG. 13 is a partial cross section of the portable terminal, taken along line 300—300 of FIG. 11. In FIG. 11 through FIG. 13, the portable terminal comprises the following elements: microphone 29 for transforming sounds to audio signals;

speaker 30 for transforming audio signals to sounds;
operating unit 31 including push buttons;
display 32;
antenna 33;
transmitting unit 34;
receiving unit 35; and
controller 36 for controlling speaker 30, transmitter 34, receiver 35, operating unit 31 and display 32.

Display 32 comprises LCD for displaying text data such as a telephone number, and a caller's name based on arrived and transmitted information as well as searched data. Behind these displayed data, the surface lighting device is mounted.

An operation of this portable terminal is demonstrated hereinafter.

When the portable terminal receives an incoming signal, receiving unit 35 sends an incoming signal to controller 36. Based on the incoming signal, controller 36 then lights surface lighting device 13 and displays a given text data. Further, when a button on operating section 31 is pushed to inform the arrival of incoming signal, the signal is sent to controller 36. Controller 36 then puts respective sections in a receiving mode. In actual, a signal received by antenna 33 is transformed into an audio signal at receiver 35. The audio signal is output from speaker 30 as sound. On the other hand, sound fed into microphone 29 is transformed to an audio signal. The audio signal is sent out from antenna 33 via transmitting unit 34.

When a user sends an transmitting signal, firstly a signal informing a transmission is sent from operating section 31 to controller 36. Secondly a signal corresponding to a telephone number is sent from operating section 31 to controller 36. Then controller 36 transmits the signal corresponding to the telephone number from antenna 33 via transmitter 34. The signals fed into controller 36 are often displayed on display 32 by emitting surface lighting device 13. When a communication with a recipient is established by the transmitted signal, a signal informing a successful communication is sent to controller 36 from antenna 36 via receiving unit 35. Then controller 36 puts respective sections in a transmitting mode. In actual, a signal received by antenna 33 is transformed into an audio signal at receiving unit 35. The audio signal is supplied from speaker 30 as sound. On the other hand, sound fed into microphone 29 is transformed to an audio signal. The audio signal is sent out from antenna 33 via transmitting unit 34.

In this embodiment, sound is transmitted and received. It is not limited to sound, but text data and the like other than sound can be at least transmitted or received by electronic apparatuses with the same advantage.

A construction of display 32 and its surrounding is detailed with reference to FIG. 13. Housing 11 includes the following elements:

LCD element 12 for displaying information of the portable terminal;
surface lighting device 13 used in one of embodiments 1 through 4; and
circuit board 14 on which device 13 and electronic circuits are mounted.

This surface lighting device in the portable terminal allows the display to reduce uneven luminance. Therefore, a portable terminal with high visibility and little recognition-errors is achievable. Since only one LED is used in the device, the portable terminal consumes less power.

When LED 20 including a plurality of light-emitting elements having different light wavelengths is used in surface lighting device 13, the following advantages are achievable:

1. An irradiating color is changeable depending on user's taste.
2. A time detector is additionally disposed in the terminal, and a light wavelength to be emitted is switched depending on the time when the display is irradiated. For instance, a peak of human luminosity is around 555 nano-meter in light surroundings, while the peak moves to shorter wavelengths in darker surroundings. Thus a green element is emitted in the daytime with the light surroundings, and a blue element is emitted at night with the dark surroundings to respond to this nature of human luminosity. This realizes a surface lighting device which always keeps bright and easy-to-see display. Further, if a calendar function is incorporated, switching times can be varied depending seasons so that the LEDs in the device can be switched at an optimal time around the year. A detector for sensing outside luminance is disposed, and the colors of LEDs are changeable responsive an output of the detector.
3. A telephone diary has been stored in the terminal, and when an incoming call arrives, a color irradiated by the surface lighting device is changeable depending on a caller.

In this fifth embodiment, the surface lighting devices discussed in embodiments 1 through 4 are used; however, other surface lighting devices discussed previously can be mounted to the terminal with the same advantages.

Exemplary Embodiment 6

Figure 24:
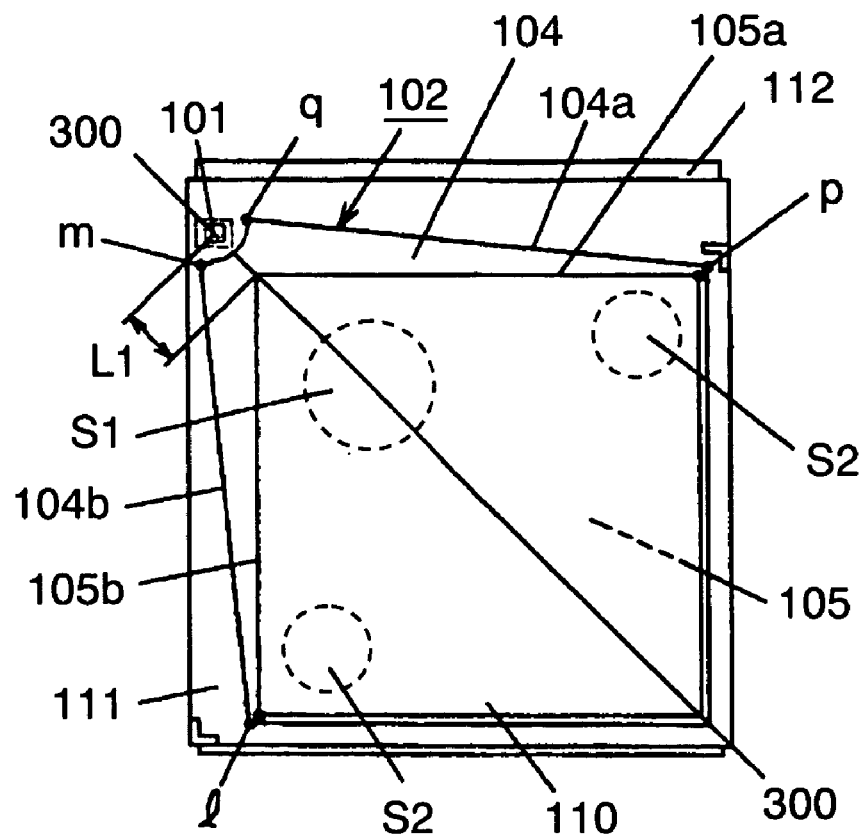
FIG. 24 is a front view of a surface lighting device in accordance with an exemplary embodiment of the present invention.
Figure 25:
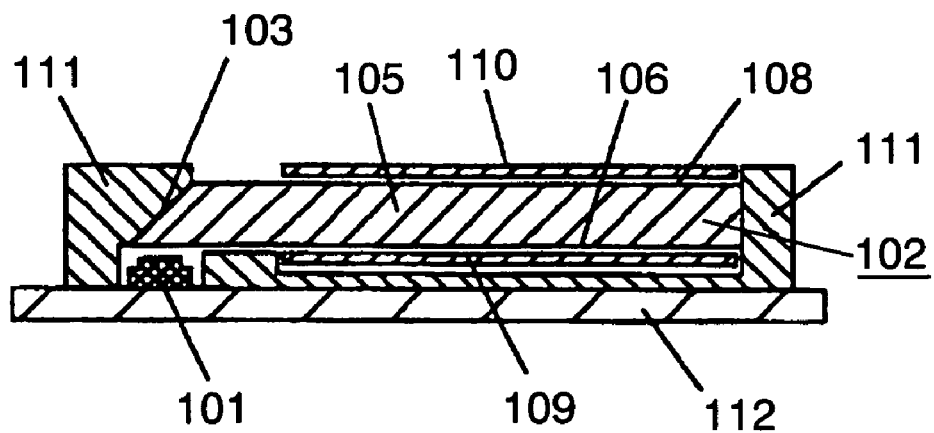
FIG. 25 is a cross section of a surface lighting device in accordance with an exemplary embodiment of the present invention.
Figure 26:
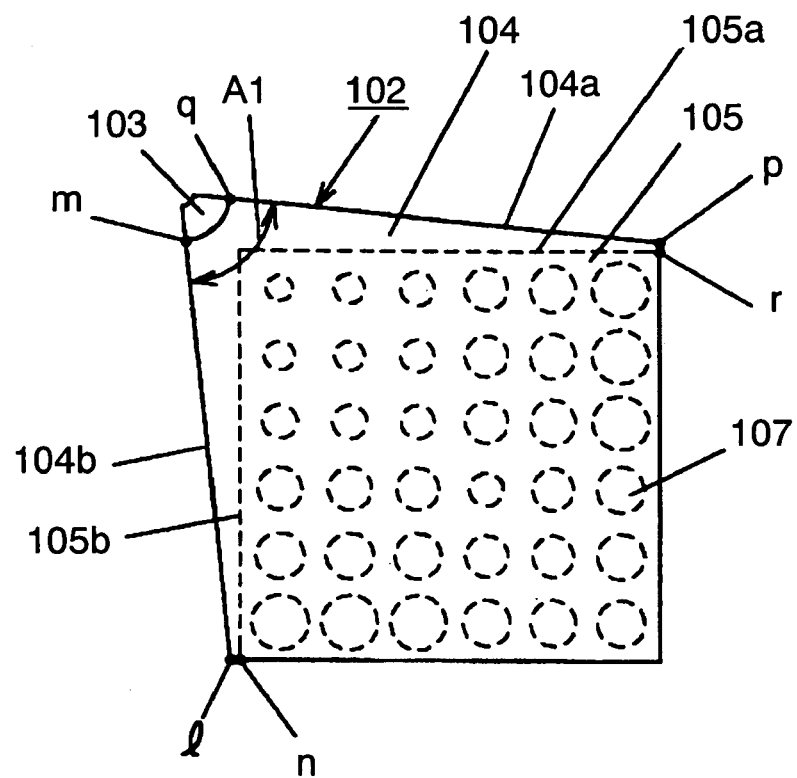
FIG. 26 is a front view of a surface lighting device in accordance with an exemplary embodiment of the present invention.

FIG. 24 is a front view of a surface lighting device in accordance with the sixth exemplary embodiment. FIG. 25 is a cross section of the same device, and FIG. 26 is a front view of another surface lighting device.

In FIG. 24, LED 1, LED 20 and the equivalents can replace LED 101.

Light-guide-board 102 is made of an organic material having a high transparency such as methacrylic resin or polycarbonate resin, or glass. In this embodiment, methcrylic resin featuring a high light-transmittance is used.

Light-guide-board 102 comprises light-inlet 103, light-guiding section 104 and light-emitting section 105. The dotted line connecting corners "r" and "n" of emitting section 105 in FIG. 26 defines an interface between light-guiding section 104 and light-emitting section 105. Given corners of board 102 are marked with "m", "q", "p" and "l".

Light-inlet 103 guides light inside light-guide-board 102. As shown in FIG. 25, when LED 101 is disposed below light-guide-board 102, light-inlet 103 is formed by an incident plane and a reflecting plane which reflects incident light to emitting section 105. This reflecting plane is a slope on an end face of board 102 and widens from LED 101 and forms a sector shape. This reflecting plane is disposed just above LED 101. This structure allows the light-inlet to scatter the light from LED 101, and then the light travels into the light-guide board. As a result, the luminance distribution is improved and the better visibility is expected. Since LED 101 is placed under light-inlet 103 of board 102, the surface lighting device can be further downsized.

As shown in FIG. 26, light-guiding section 104 widens from ends "q" and "m" of board 2 toward the corresponding corners "p" and "l" and forms V-shape.

Light-emitting section 105 emits the light from light-guide board 102 to the outside. The construction of section 105 is the same as that discussed in the first embodiment.

The constructions of reflecting layer 109 disposed beneath scattering section 106, scattering layer 110 disposed on emitting section 105, and holder 111 are also the same those discussed in the first embodiment. LED 101 is mounted on circuit substrate 112, which holds holder 111 at a given place in order to position LED 101 so that LED 101 can be placed just below light-inlet 103.

An operation of the surface lighting device as structured above is demonstrated hereinafter. First, the light from LED 101 enters to incident plane of light-inlet 103. Then the light is reflected on the reflecting plane, and most of the light has an angle component satisfying conditions of total reflection at an interface between resin and air, so that this light is guided inside the board 102. Parts of the light incident on board 102 is reflected on light-guiding section 104, then guided toward light-emitting section 105. A part of the light is directly guided to section 105. In light-emitting section 105, the light guided by guiding-section 104 is totally reflected and shielded efficiently; however, the light striking scattering pattern 107 on the lower face of section 105 is reflected randomly in diverse directions or travels through. Only the light having an angle greater than the critical angle at the total reflection runs out of board 102. Some light out of this light arrives at emitting face 108, and then is emitted. Some other light strikes reflecting layer 109 and holder 111, and then is reflected and returned inside board 102 again. As such, almost all the light, except some amount absorbed on the way, guided inside board 102 is emitted from emitting face 108 for surface lighting.

As such, the light from LED 101 enters to the incident plane of light-inlet 103, then the reflecting plane reflects this light. The light is then guided inside light-guide-board 102. In this case, a thicker board 102 allows a distance from LED 101 to light-inlet 103 to increase, thereby reducing the area of light-guiding section. As a result, the surface lighting device can be downsized.

In this sixth embodiment, LED 101 is placed at a corner of board 102. The light from LED 101 is guided inside board 102 so that a center axis of light distribution of the incident light can slant with respect to sides 104*a* and 104*b* of board 102. This structure allows light-emitting-section 105 to output uniform luminance, thereby realizing the surface lighting device featuring an excellent visibility.

LED 101 is placed around a corner of light-emitting-section 105 of board 102, and light-scattering-regulation angle A1 around light-inlet 103 forms an acute angle as shown in FIG. 26. This structure allows some light out of the light from LED to irradiate section S2 on a scattering board shown in FIG. 24. This some light is around point P2 shown in FIG. 34 and has a strong relative intensity. Light-inlet 103 is formed with a curved face parallel to light-emitting-section 105, and a cross section of the curved face forms an arc. Thus the light around point P1 shown in FIG. 34 having a strong relative intensity can contribute to irradiating the section S2. This structure reduces a difference in luminance between section S2 and section S1 which is irradiated by the light around point P1 having a strong relative intensity.

A luminance distribution which does not cause irregular image for human eyes is desirably not less than 0.3R, where R is luminance rate.

R=minimum luminance/maximum luminance

In order to achieve this condition, the light mainly irradiating section S2 has a relative intensity not less than 70%. For this, the light-scattering-regulation angle A1 is preferably not more than 90 degree. In this embodiment, as shown in FIG. 24, the length L1 of a light-guiding-route extending from LED to light-emitting-section is shortened for placing the LED at the corner of the light-guiding section, and yet, light-scattering regulation angle A1 can be set at less than 90 degree.

Preferable value of angle A1 is $45° \leq A1 \leq 90°$; and more preferable range is $60° \leq A1 \leq 85°$ for further downsizing the surface lighting device. When angle A1 is not more than 85°, the light incident on light-guide-board 102 is reflected not perpendicularly without fail. Therefore the light reflected on circumference of light-inlet 103 returns to light-inlet 103 without entering into light-emitting-section 105. This structure prevents this reflected light from being stray light, leaking out of board 2 and irradiating a wrong place. This structure can guide almost all the light incident on light-guide-board 2 into light-emitting-section 105, thereby increasing the light utilization factor.

In actual, the following two samples are compared under the common condition below:
  Condition: light-emitting face is a square with 30 mm sides;
  light-guiding-route length L1 is 3 mm;
  thickness of light-guide-board is 1 mm;
  one green GaN LED is used; and
  10 mA current flows respective LEDs.
  Sample 1 to be compared with the sample in accordance with this embodiment: One LED is disposed at the center, light-guiding-route length L2 is 3 mm, light scattering regulation angle A1 is 160 degrees.
  Sample 2 in accordance with this embodiment: light-scattering regulation angle A1 is 85 degrees.

Under the conditions discussed above, the luminance distributions of each sample are measured: Sample 1 produces luminance rate R=0.18, and sample 2 produces R=0.68. When the sample 2 is viewed through a semi-transparent LCD, almost no luminance distribution is observed. This comparison proves that sample 2 in accordance with this embodiment is substantially improved.

As such, this sixth embodiment proves that even the light-guiding-route is shortened, the incident light can be substantially spread in the width direction of light-guide-board, so that less numbers of LED can distribute the luminance more uniformly. The shorter length of light-guiding route allows the light-guide board to be downsized in volume, whereby a small size surface lighting device is obtainable. The less numbers of LEDs can reduce power consumption, and at the same time, reduces a number of processes of mounting LEDs onto a substrate. As a result, a surface lighting device easy-to-manufacturing and operating with less power is achievable.

In this embodiment, straight line 104*b* connecting corners "m" and "l" approaches to line 105 (an element of light-emitting section 105) at a greater distance from LED 101. Straight line 104*a* connecting corners "q" and "p" also approaches line 105*b* (an element of section 105) at a greater distance from LED 101. This structure allows the light emitted from LED 101 to travel more efficiently to light-emitting-section 105, thereby distributing the luminance further more uniformly. Section S2, among others, is irradiated efficiently thanks to this structure. This structure also allows a projection area of light-guide-board 102 to be smaller, so that the space within the surface lighting device can be more efficiently used. As a result, more design flexibility is obtained and the device can be further downsized.

Figure 27:
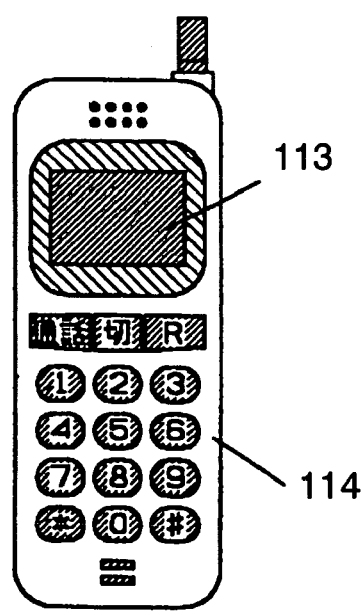
FIG. 27 is a front view of a portable terminal in accordance with an exemplary embodiment of the present invention.
Figure 28:
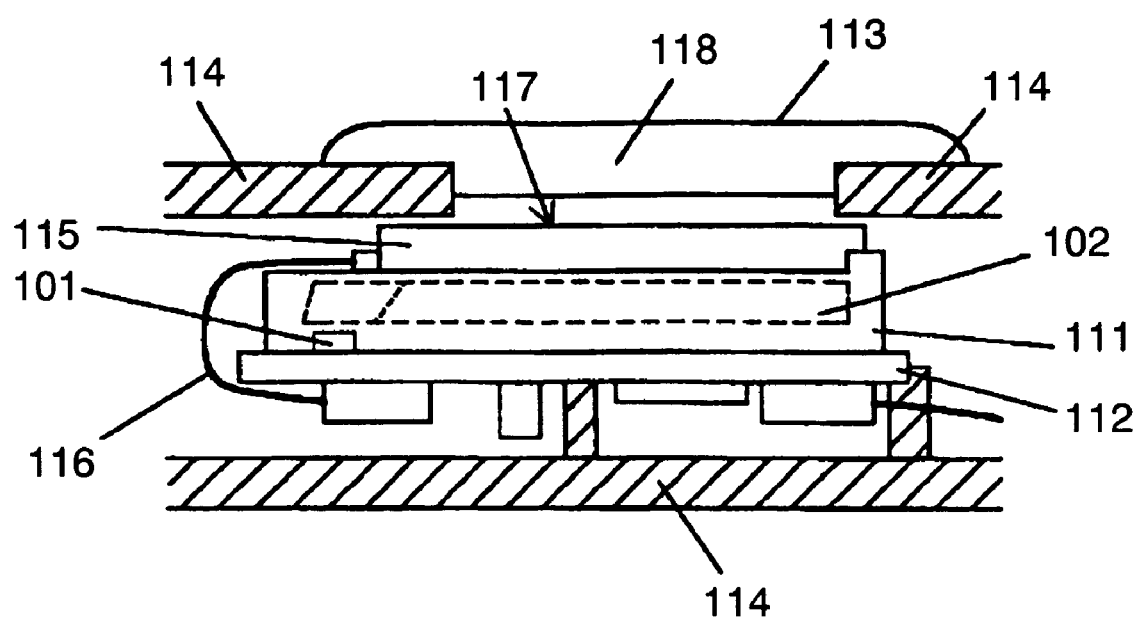
FIG. 28 is a perspective view of a portable terminal in accordance with an exemplary embodiment of the present invention.

Next, a display unit employing this surface lighting device and a portable terminal employing the display unit are demonstrated with reference to FIG. 27 and FIG. 28. FIG. 27 is a front view of the portable terminal in accordance with this embodiment, and FIG. 28 is a partial cross sectional view of the same portable terminal. In FIG. 27, the portable terminal is equipped with display section 113 employing LCD 117 for displaying a telephone number. FIG. 28 is a perspective view of display section 113 from the terminal lateral side. LCD 117, comprising reflection type LCD element 115, is disposed on the surface lighting device in accordance with this embodiment, and wiring 116 for display is disposed to cover LED 101 of the surface lighting device. Employing the surface lighting device in accordance with this embodiment, LCD 117 realizes a small size and a low power consumption free from lowering its visibility. If stray light from LED 101 leaks from sections other than light-emitting-face 108, wiring 116 for display blocks almost all the leakage light, thereby improving the visibility. A display on LCD 117 of display section 113 is seen through display-window 118 made of transparent material. Thanks to employing this LCD 117, a portable terminal operating with a lower power and having excellent visibility is obtainable.

In the portable terminal as structured above, a number of LEDs 101 can be reduced, so that the terminal consumes less power and LEDs 101 need a narrower space for mounting as well as the light-guiding-section requires a shorter length. As a result, the portable terminal can be downsized.

The space within the portable terminal can be used more efficiently, so that more design flexibility is obtainable and the wiring can be done more efficiently as well as the circuit board can be efficiently placed. This space freedom restrains unreasonable or forcible placement of the components, and this can lower troubles and defectives due to unreasonable or forcible placement of the components. As a result, a reliable display unit and a portable terminal are obtainable, and they can be downsized.

Exemplary Embodiment 7

Figure 35:
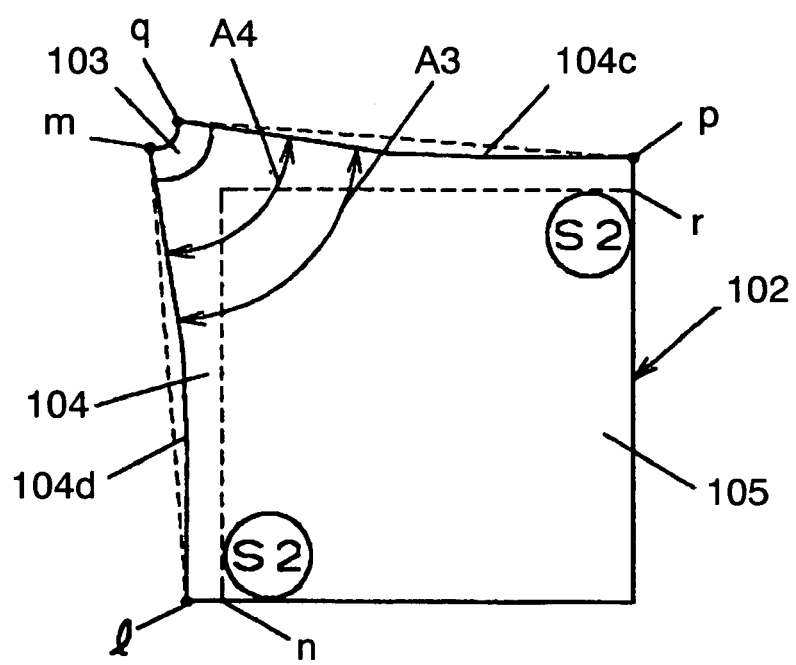
FIG. 35 is a front view of a light guide board in accordance with an exemplary embodiment of the present invention.

The seventh exemplary embodiment is demonstrated hereinafter with reference to FIG. 35, which is a front view of a light-guide-board used in this embodiment. In FIG. 35, light-emitting-section 105 and light-inlet 103 are the same as those discussed in the sixth embodiment, and the descriptions thereof are thus omitted here.

In this embodiment, end section 104c of light-guiding section 104 is recessed toward light-emitting-section 105 from the straight line connecting the corners "q" and "p" of light-guide-board 102. End section 104d of section 104 is also recessed toward section 105 from the straight line connecting the corners "m" and "l". This structure allows the light emitted from LED 101 to spread at angle A4 narrower than angle A3. Therefore, the light nearer to the center, where intensity is stronger, can irradiate section S2 which otherwise receives lower luminance. As a result, section S2 receives greater luminance efficiently, and the light-emitting-section produces a narrower dispersion of luminance distribution.

Figure 34:
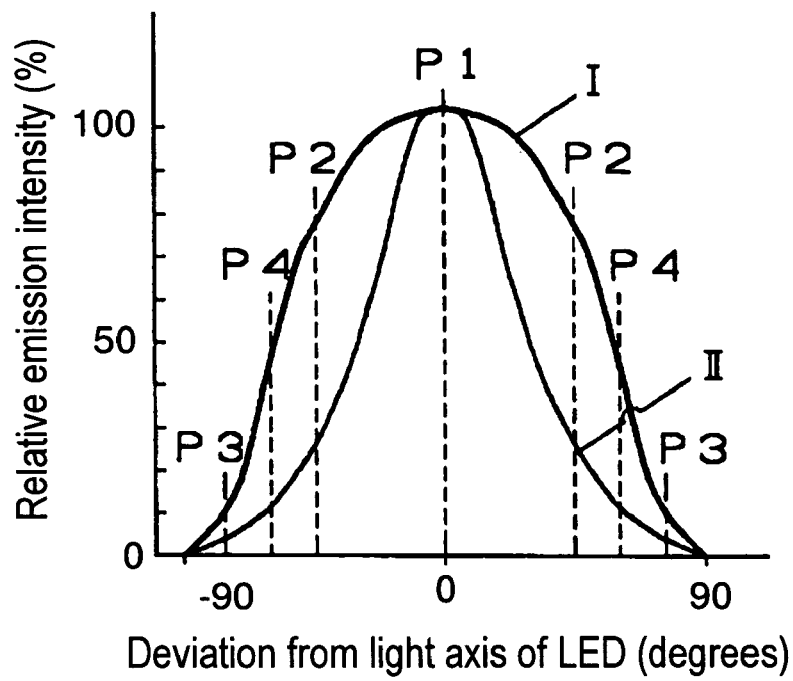
FIG. 34 is a graph illustrating relative light intensities emitted from an LED in accordance with an exemplary embodiment of the present invention.

When an LED having the intensity concentrated at the center as shown in FIG. 34 marked with "II" is employed, this structure allows the light to travel with uniform luminance to light-emitting-section 105. As a result, the luminance distribution at light-emitting-section 105 can be minimized, thereby realizing a surface lighting device with stable operation independent of intensity characteristics of LEDs to be employed.

In this embodiment, end sections 104c and 104d are recessed toward section 105; however, they can be in a wave-like shape, or saw-teeth like shape. This structure can minimize the luminance distribution at light-emitting-section 105.

Exemplary Embodiment 8

Figure 30:
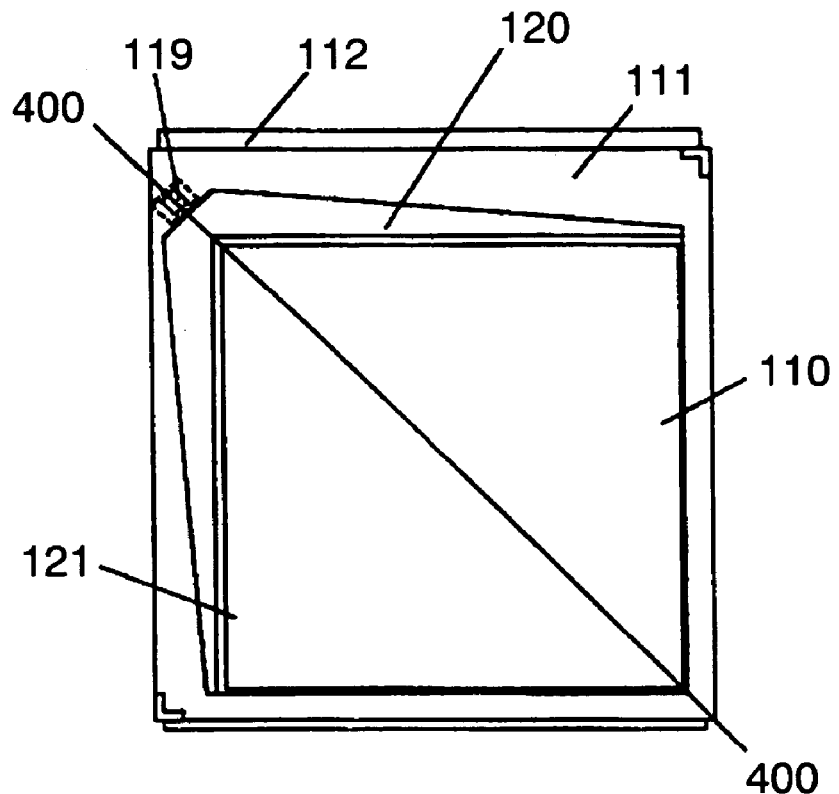
FIG. 30 is a front view of a surface lighting device in accordance with an exemplary embodiment of the present invention.
Figure 31:
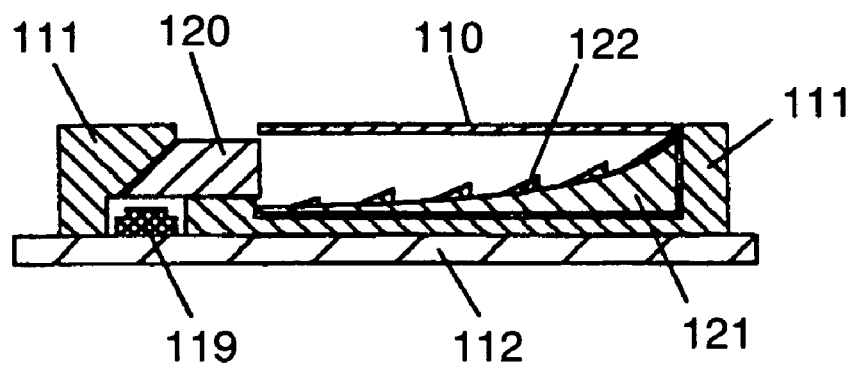
FIG. 31 is a cross section of a surface lighting device in accordance with an exemplary embodiment of the present invention.
Figure 32:
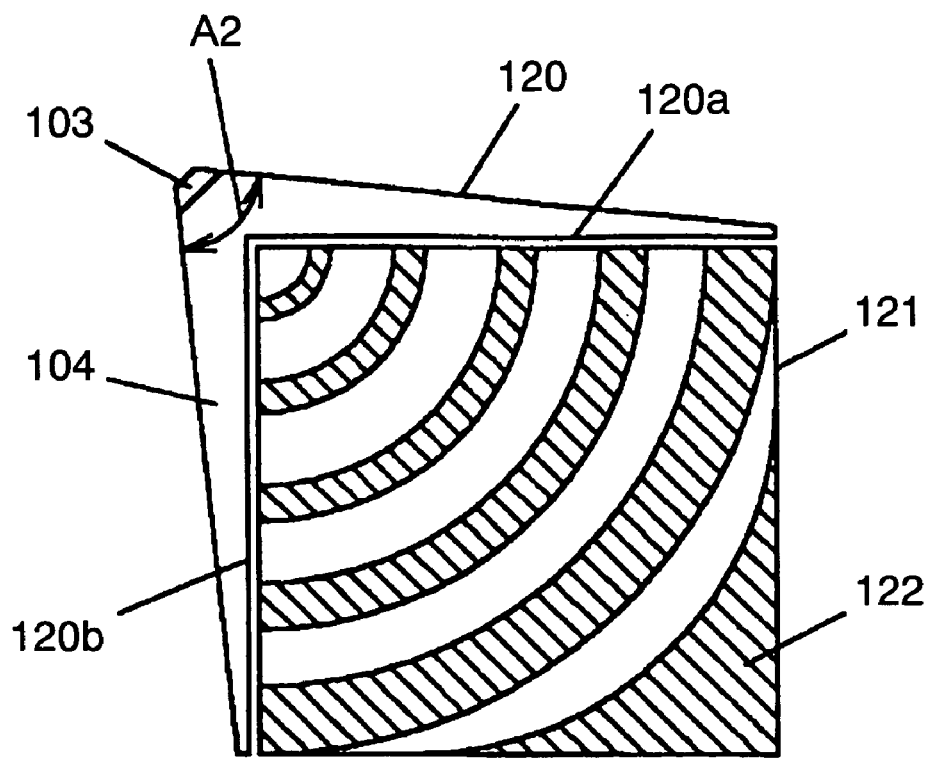
FIG. 32 is a front view of a surface lighting device in accordance with an exemplary embodiment of the present invention.
Figure 33:
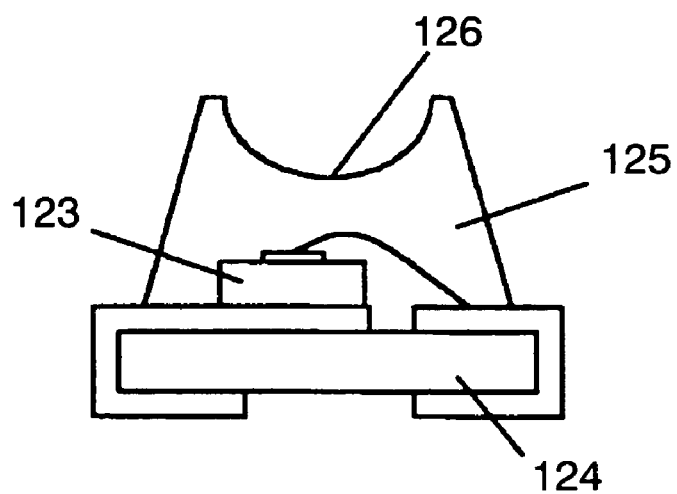
FIG. 33 is a lateral view of an LED in accordance with an exemplary embodiment of the present invention.

The eighth exemplary embodiment is demonstrated hereinafter with reference to FIG. 30 through FIG. 33. FIG. 30 is a front view of a surface lighting device in accordance with the eight exemplary embodiment. FIG. 31 is a cross section of the same device taken along line 400—400 of FIG. 30. FIG. 32 is a front view of a light-guide-board and a diffused reflection board of the surface lighting device in accordance with this embodiment. FIG. 33 is a lateral view of an LED used in this embodiment. Scattering layer 110, holder 111 and circuit substrate 112 in FIG. 30 are the same as those described in the sixth embodiment. The descriptions thereof are thus omitted here.

LED 119 comprises light emitting element 123 mounted on substrate 124, and element 123 is covered with transparent and cylindrical resin 125 of which top has recess 126 thereon. An axial line of recess 126 is approximately parallel to diagonal line 400—400, and thus approximately concave lens is disposed above a light-emitting-face of LED 119. This structure spreads the light from the LED so that a luminance distribution is improved, thereby increasing the visibility of the device. In this embodiment, light-guide-board 120 is constructed with light-inlet 103 and light-guiding section 104 only, and these two elements are made of high light-transmitting material such as methacrylic resin. Lateral sides of board 120 are light-emitting faces 120a and 120b, and diffused reflection board 121 is disposed adjacently to these light-irradiating faces. Diffused reflection board 121 increases its thickness at a greater distance from LED 119, and has diffused reflecting pattern 122 thereon. Pattern 122 form numbers of approx. triangles in cross sectional view, and the patterns are distributed in a concentric pattern centered on LED 119 as shown in FIG. 32.

In this embodiment, diffused reflection board 121 is made of ABS resin in white color, and unitarily molded with diffused reflection pattern 122 by injection molding; however, board 121 can be made of other materials than resin as far as the material is in white and has a high reflectance. Pattern 122 can be formed by printing. Board 121 and holder 111 can be unitarily molded. The surface lighting device of this embodiment has less weight than that of the sixth embodiment, therefore a display unit employing this device weighs substantially less, and naturally, a portable terminal also weighs much less for users to handle the terminal conveniently.

In this embodiment, the incident light from LED 119 is scattered by light-guiding-section 104 in the same manner as in the sixth embodiment, and then emitted from light-emitting-faces 120a and 120b. The emitted light is diffusely reflected by diffused-reflection pattern 122 and then enters into the scattering layer to irradiate the surface. Meanwhile the light incident on diffused-reflection-board 121 would have more luminance at a closer distance to LED 119. In order to overcome this problem, the pattern 122 is arranged so that the area ratio of the pattern increases at a greater distance from LED 119. This arrangement contributes to reducing the luminance distribution. The light of LED 119 is scattered to some degree by recess 126 in advance and then emitted, therefore, the light at light-guiding-section 104 is progressively scattered, thereby further reducing the luminance distribution.

In this embodiment, LED 119 is placed at a corner of light-guiding-board 120, and light-scattering regulation angle A2 forms an acute angle around light-inlet 103 as shown in FIG. 32. This structure improves the luminance distribution for the same reason as described in the sixth embodiment.

In actual, a sample having the following structure measures a luminance distribution R=0.70, thus an improvement in the luminance distribution is proved: upper surface of diffused reflection board forms a square having sides of 30 mm length, a length of light-guiding-route is 3 mm; a thickness of light-guide-board is 1 mm; one green GaN LED is used as a light source; angle A2 forms 85 degree; and current of 10 mA flows the LED.

The eight embodiment as discussed above proves that the small and light weight surface-lighting-device with low power consumption and easy-to-manufacture is achievable. The display unit employing this surface lighting device also becomes small in size and light in weight, consumes less power and provides an excellent visibility. The portable terminal using this display unit can provide the same advantages as the display unit.

Exemplary Embodiment 9

Figure 36:
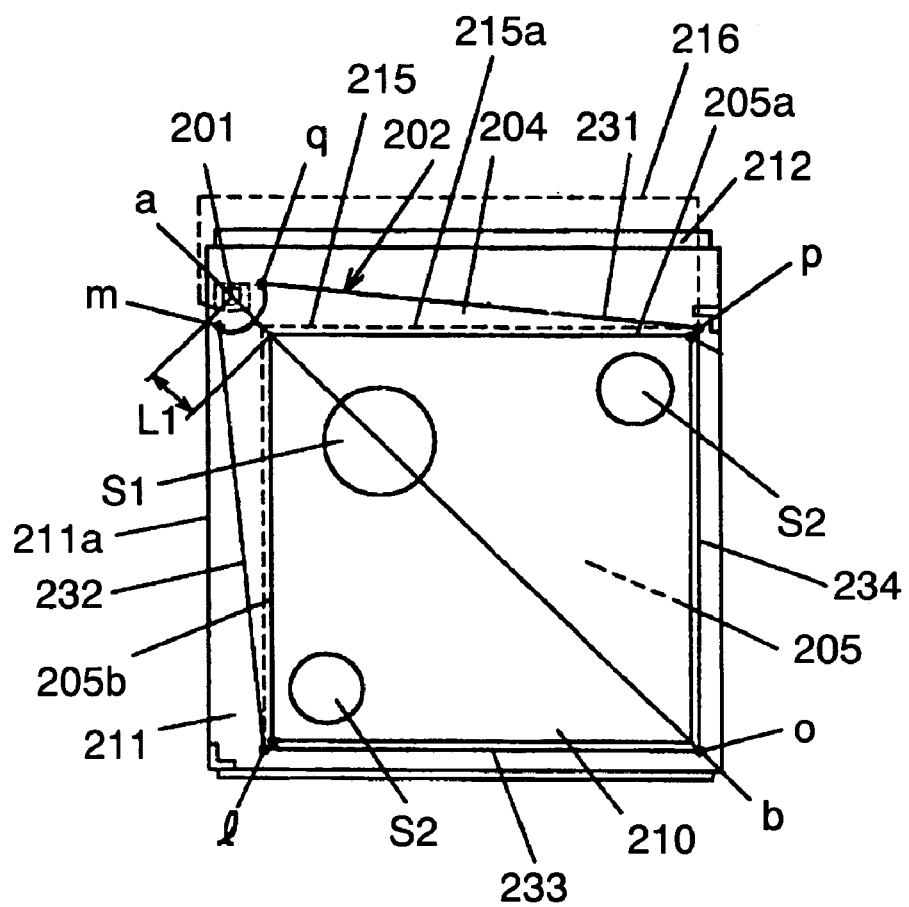
FIG. 36 is a front view of a surface lighting device in accordance with an exemplary embodiment of the present invention.
Figure 37:
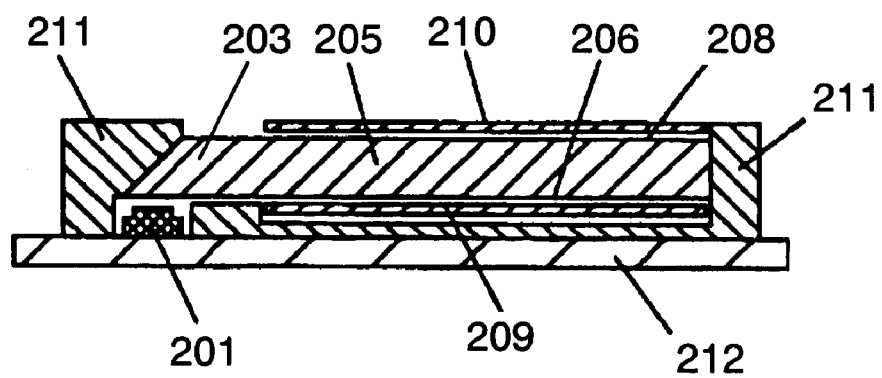
FIG. 37 is a cross section of a surface lighting device in accordance with an exemplary embodiment of the present invention.
Figure 38:
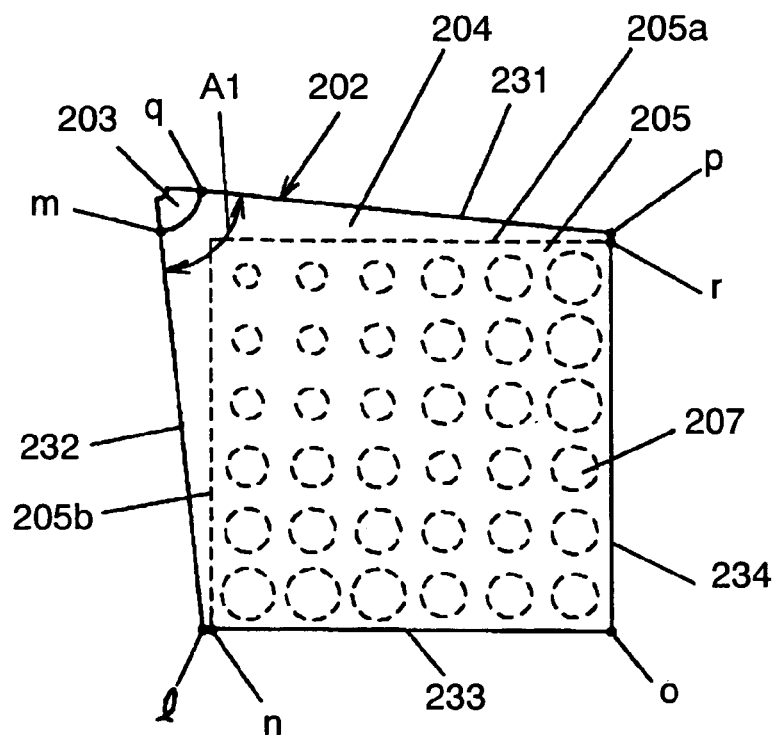
FIG. 38 is a front view of a surface lighting device in accordance with an exemplary embodiment of the present invention.

FIG. 36 is a front view of a surface lighting device in accordance with the ninth exemplary embodiment, and FIG. 37 is a cross section of the same device. FIG. 38 is a front view of another surface lighting device used in this embodiment.

LED 201 in FIG. 36 can be replaced with LED 1 used in the previous embodiments. Light-guide-board 202 comprises light-inlet 203, light-guiding section 204 and light-emitting section 205. Board 2 can be made of the same material as that of board 2 discussed in previous embodiments. The dotted line connecting corners "r" and "n" of emitting section 205 defines an interface between light-guiding section 204 and light-emitting section 205 as shown in FIG. 38. Given corners of board 202 are marked with "m", "q", "p", "l" and "o".

Light-inlet 203 guides the light inside light-guide-board 202. When LED 201 is disposed below light-guide-board 202, light-inlet 203 is often formed by an incident plane and a reflecting plane which reflects incident light to emitting section 205. This reflecting plane is a slope on an end face of board 202 and widens from LED 201 and forms a sector shape. This reflecting plane is disposed substantially above LED 201. This structure allows the light-inlet to scatter the light from LED 101, and then the light travels into the light-guiding section 204. As a result, the luminance distribution is improved and the better visibility is expected. Since LED 201 is placed below light-inlet 203 of board 202, the area of light-guiding section 204 can be smaller as well as the surface lighting device can be further downsized than the device where LED 201 is disposed on the lateral side of board 202.

Light-emitting-section 205 emits the light outside from light-guide-board 202. One face thereof is light-emitting face 208 that emits the light outside, and an end of the other face is scattering section 206 having scattering pattern 207 thereon. Scattering pattern 207 are dots formed on the lower face of light-emitting-section 205 and painted with an ink ranging between milky-white and white. Scattering dots are formed so that the dot area becomes greater at a longer distance from LED 201 as shown in FIG. 38. The light incident on light-emitting-section 205 has more luminance at closer distance to LED 201, thus the distribution of the printed area of scattering dots can be changed, so that even luminance distribution of light-emitting-face 208 is achievable.

The material and manufacturing method of scattering pattern 207 are the same those discussed in the first embodiment.

Light-guiding-section 204 widens to form V-shape from end sections "q" and "m" toward corresponding corners "p" and "q".

Reflecting layer 209 is placed beneath scattering section 206 and has a high reflectance. The surface of layer 209 is made of white film including titanium oxide.

Diffusion layer 202 disposed on light-emitting-section is made of semi-transparent film finely textured, and scatters the emitted light to improve uneven lumnance.

Holder 211 for accommodating light-guide-board 202, reflecting layer 209 and diffusion sheet 210 at desirable places is made of resin because of flexibility of shape and easiness for mass manufacturing. ABS resin or polycarbonate resin are preferable, and a color, such as white, having a high reflection rate is preferable.

LED 201 is mounted on circuit board 212 which holds holder 211 at a given position to regulate the place of LED 201 just under light-inlet 203.

An operation of the surface lighting device as structured above is demonstrated hereinafter. First, the light from LED 201 enters to incident plane of light-inlet 203. Then the light is reflected on the reflecting plane, and most of the light has an angle component satisfying conditions of total reflection at an interface between board 202 and air, so that this light is guided inside the board 202. The light incident on board 202 is reflected on light-guiding section 204, then guided toward light-emitting section 205. In light-emitting section 205, the light guided by guiding-section 204 is totally reflected and shielded efficiently; however, the light striking scattering pattern 207 on the lower face of section 205 is reflected randomly in diverse directions or travels through. The light having an angle greater than the critical angle at the total reflection runs out of board 202. Some light arrives at emitting face 208, and then is emitted. Some other light strikes reflecting layer 209 and holder 211, and then is reflected and returned inside of the light-emitting-section 205 again. As such, almost all the light, except some amount absorbed on the way, guided inside board 202 is emitted from emitting face 208 for surface lighting.

As such, the light from LED 201 enters to the incident plane of light-inlet 203, then the reflecting plane reflects this light. The light is then guided inside light-guide-board 202. This structure can reduce the area of light-guiding section 204. As a result, the surface lighting device can be downsized.

In this embodiment, LED 201 is placed at a corner of board 202. The light from LED 201 is guided inside board 202 so that a center axis of light distribution of the incident light can slant with respect to sides 231 and 232 of board 202. This structure allows light-emitting-section 205 to output luminance more uniformly, thereby realizing the surface lighting device featuring an excellent visibility.

In this ninth embodiment, LED 201 is placed close to light-inlet 203 disposed on the corner of board 202, or close to the corner of light-emitting section 205. Regarding a first side face and a second side face of board 202, both the faces hold light-inlet 203, the length of first side face is longer than that of a third side face opposite to the first one, and the length of second side face is longer than that of a fourth side face opposite to the second one. To be more specific, as shown in FIG. 38, the four sides of light-guide-board 202, i.e. the first side 231 and third side 233 opposite thereto, the second side 232 and fourth side 234 opposite thereto, have different lengths respectively and are not parallel with each other. This structure prevents surrounding area of the LED from being outstandingly bright. This structure eliminates unnecessary sections on the light-guide-board, so that sections not contributing to irradiation on the light-emitting-section are reduced. As a result, a surface luminous efficiency is increased.

In this embodiment, the sides 231 through 234 are all straight lines; however, they can be curved lines or have bending points. In this case, imaginary straight lines connecting "would be" corner points of board 202, i.e. points "o", "p" "q", "m" and "l" are used for applying the concept of the present invention.

In this embodiment, the side face containing side 232 approaches to line 205b defining light-emitting-section 205 at a greater distance from LED 201, and the side face containing side 231 approaches to line 205a defining section 205 at a greater distance from LED 201. This structure guides the light from LED 201 toward section 205 more efficiently, thereby further increasing the luminance uniformity and irradiating section S2 among others more efficiently. This structure allows a projection area of light-guide-board 202 to be smaller, thereby increasing a utilization factor of the space within the surface lighting device. As a result, the device can be downsized and design flexibility can be increased.

For a comparison purpose, a sample having the following different points from the structure discussed above is produced: the sides opposite to each other have the same length, and the side faces opposite to each other are parallel. This sample can reduce the size of holder, thereby downsizing the surface lighting device per se. However, the surrounding of the LED is outstandingly bright and its luminance rate R becomes as low as not more than 0.2, which is insufficient because visibility recognition requires luminance rate R at least 0.3.

On the other hand, in this embodiment, LED 201 is placed away from light-emitting-section 205 by distance L1, thereby preventing the surrounding of LED 201 from being too bright. Luminance rate R in this embodiment is 0.67, which substantially satisfies the requirement of visibility recognition.

When another comparison is performed under the condition that the dimensions of the holders are the same, average luminance shows the following difference: Luminance is measured at 36 places in light-emitting-section 205. The sample shows its average luminance at 35 cd/m², and this embodiment shows the average luminance at 40 cd/m². This result proves that the ninth embodiment produces a better surface luminous efficiency than the sample does. Because the sample has unnecessary sections, and the light guided into those unnecessary sections do not contribute to increasing the average luminance of section 205.

The ninth exemplary embodiment as discussed above, the four side faces of board 202 have different lengths with each other and are not parallel. This structure prevents the surrounding of the LED being too bright, and allows the surface lighting device per se to produce an average luminance at a substantially high level. Further, a number of LEDs are reduced thereby lowering the power consumption as well as simplifying the assemble woks of mounting LEDs on a substrate. As a result, a surface lighting device operating at a low power and easy-to-manufacture is obtainable.

Exemplary Embodiment 10

Figure 41:
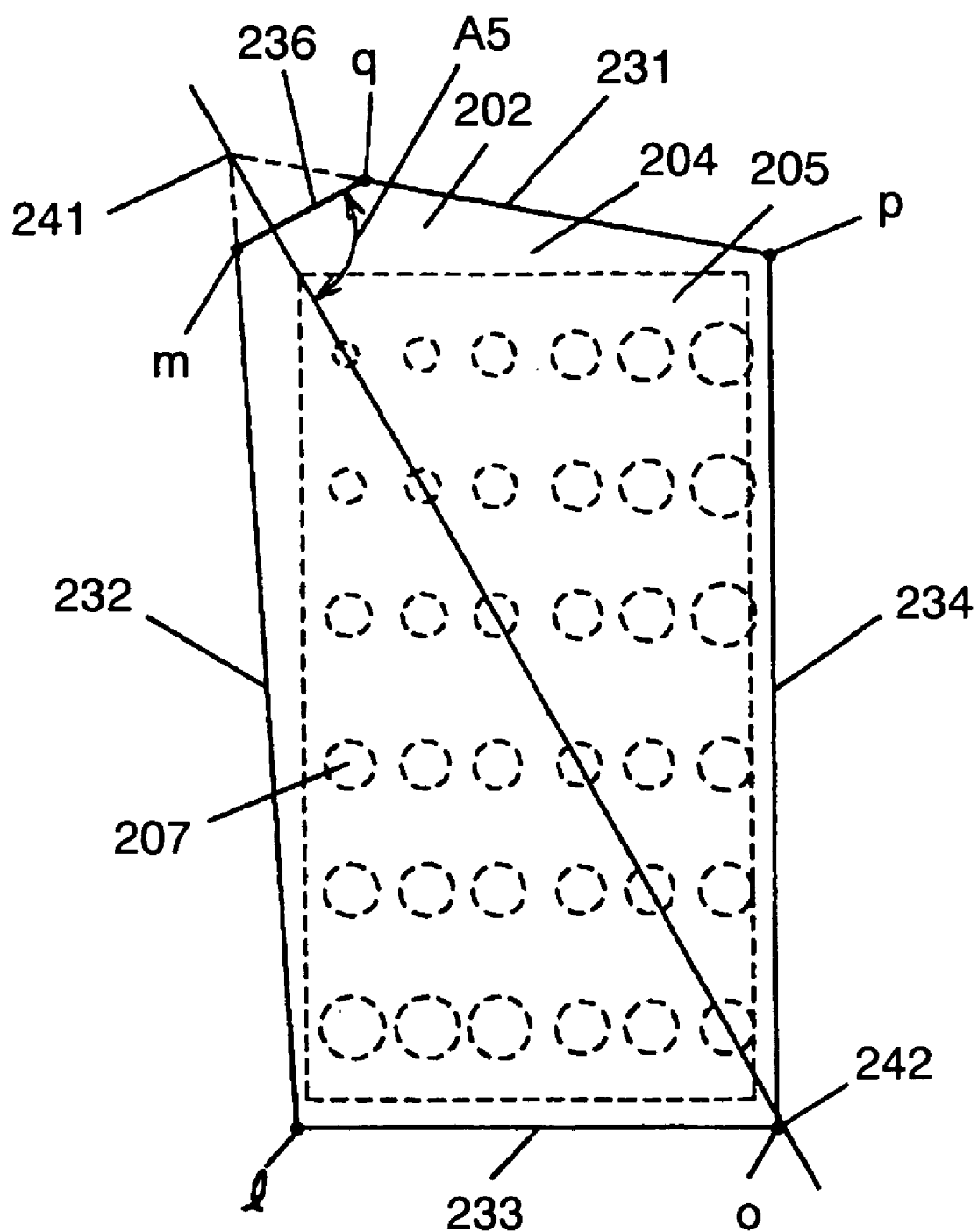
FIG. 41 is a front view of a surface lighting device in accordance with an exemplary embodiment of the present invention.

FIG. 41 is a front view of a surface lighting device in accordance with the tenth exemplary embodiment of the present invention. In this embodiment, an LED, reflecting layer, diffusion layer, holder and circuit substrate are the same as those discussed in the ninth embodiment.

Figure 42:
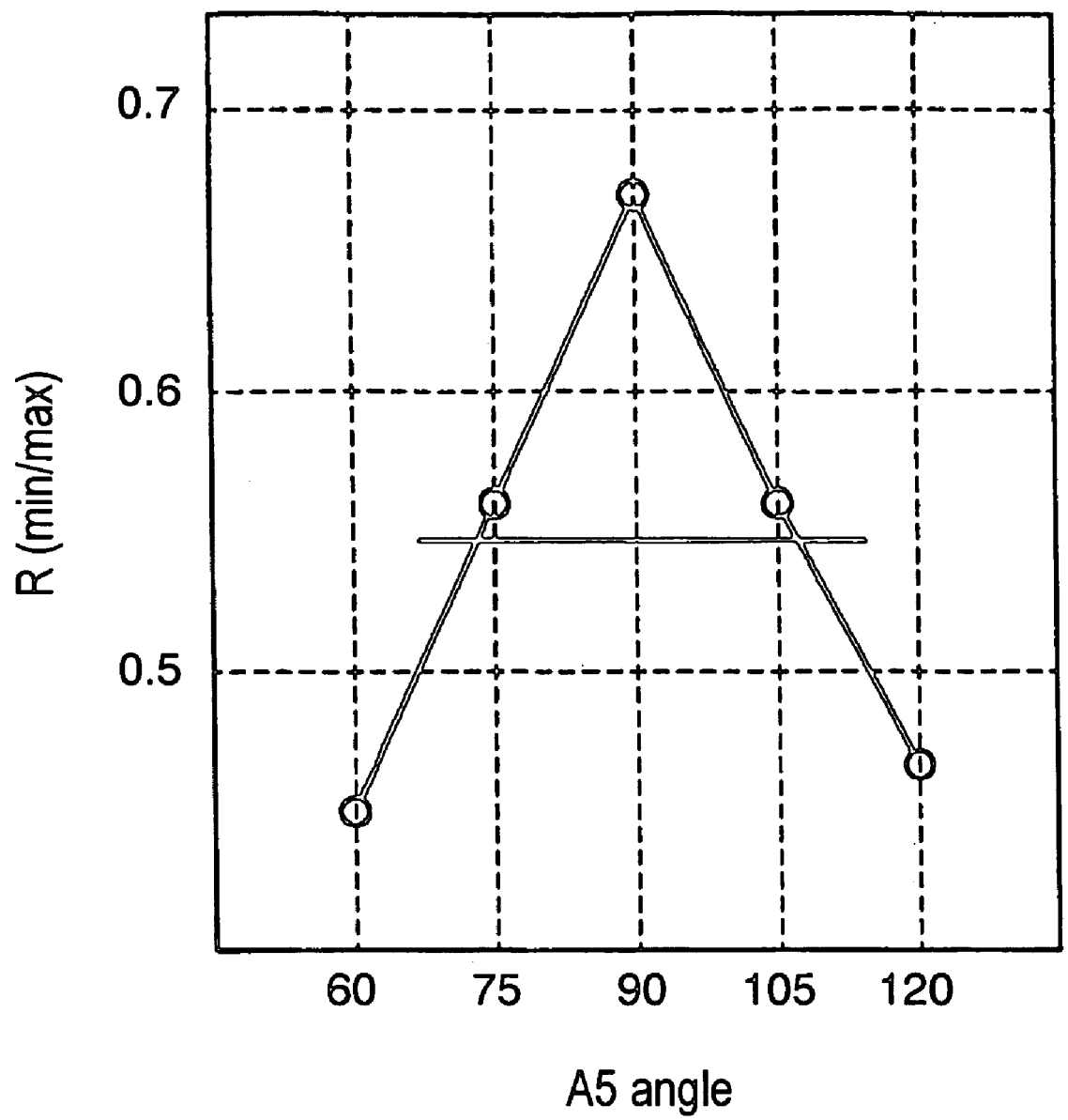
FIG. 42 illustrates characteristics illustrating a relation between an angle forming a sixth side of a surface lighting device and uneven luminance in accordance with an exemplary embodiment of the present invention.

Light-emitting section in this embodiment shapes in a rectangular, as shown in FIG. 41, which requires one LED to distribute the light sufficiently in the longitudinal direction. Two sides of light-guide-board 202 closer to LED 201 are referred to as first side 231 and second side 232. An opposite side to first side 231 is referred to as third side 233, and an opposite side to second side 232 is fourth side 234. First side 231 and second side 232 are extended until they cross, and the point of this intersection is referred to as first point 241. Third side 233 and fourth side 234 are extended until they cross, and the point of this intersection is referred to as second point 242. A straight line connecting first point 241 and second point 242 forms an angle A5 with sixth side 236 connecting end point "q" of first side 231 and end point "m" of second side 232. Angle A5 is approx. a right angle. This structure allows the light from LED 201 to travel in sufficient amount to the farthest place in light-emitting-section 205 from LED 201, thereby improving uneven luminance due to the rectangular of section 205. Angle A5 is desirably 90 degrees, and the slant of sixth side 236 can be varied by changing the positions of end points "q" and "m". FIG. 42 illustrates the changes of luminance ratio R by varying angle A5, where luminance ratio R=min. luminance/max. luminance. As shown in FIG. 42, when angle A5 stays at 90 degrees, luminance rate R stands at the highest value. Angle A5 is thus desirably approx. 90 degrees. As discussed previously, from the viewpoint of visibility recognition, luminance ratio R should be not less than 55% for realizing good characteristics of the surface lighting device. Angle A5 thus preferably ranges between 75 and 105 degree.

In this embodiment, all sides 231 through 234 are straight lines; however they can be curved lines or have bending points. In this case, imaginary straight lines connecting "would be" corner points of board 202, i.e. points "o", "p" "q", "m" and "l" are used for applying the concept of the present invention. The surface lighting device of this embodiment (whatever shape of light-emitting-face the device has) allows a display unit using thereof and a portable terminal using the display unit to be small in size and consume low power as well as have excellent visibility in the display unit.

Exemplary Embodiment 11

The surface lighting devices described in embodiments 9 and 10 are employed in various electronic apparatuses, and the devices are used in numbers of portable terminals. In this embodiment, a portable terminal using these surface lighting devices is demonstrated.

Figure 39:
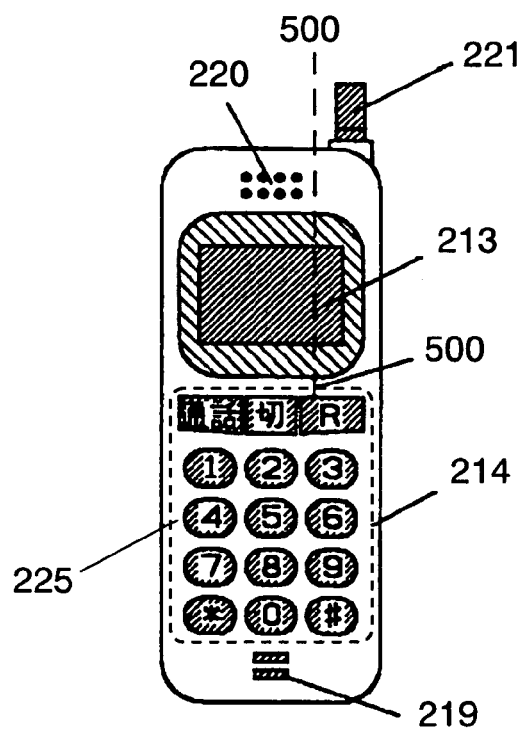
FIG. 39 is a front view of a portable terminal in accordance with an exemplary embodiment of the present invention.
Figure 40:
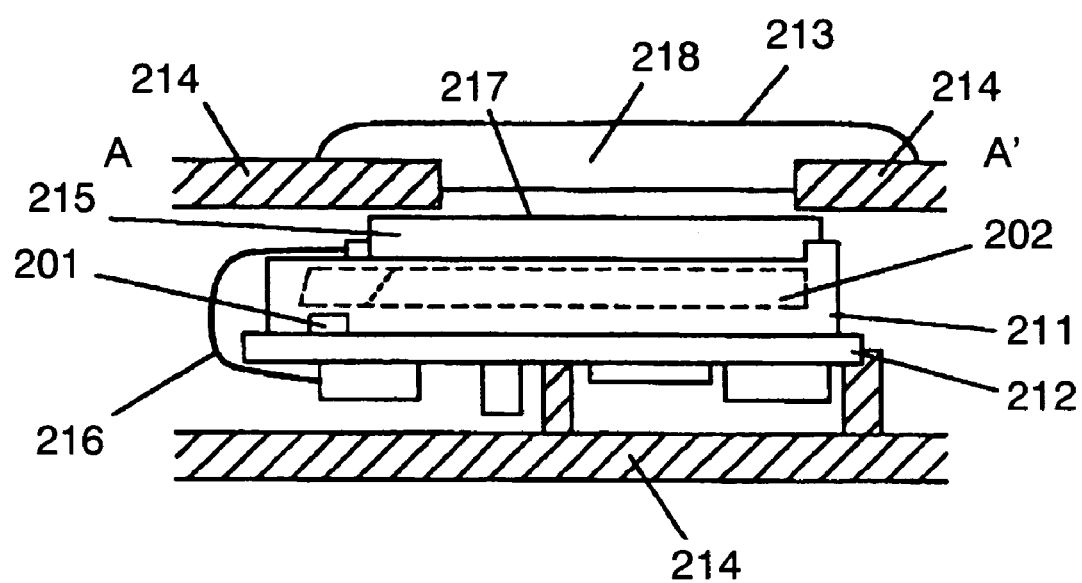
FIG. 40 is a cross section of a portable terminal in accordance with an exemplary embodiment of the present invention.
Figure 43:
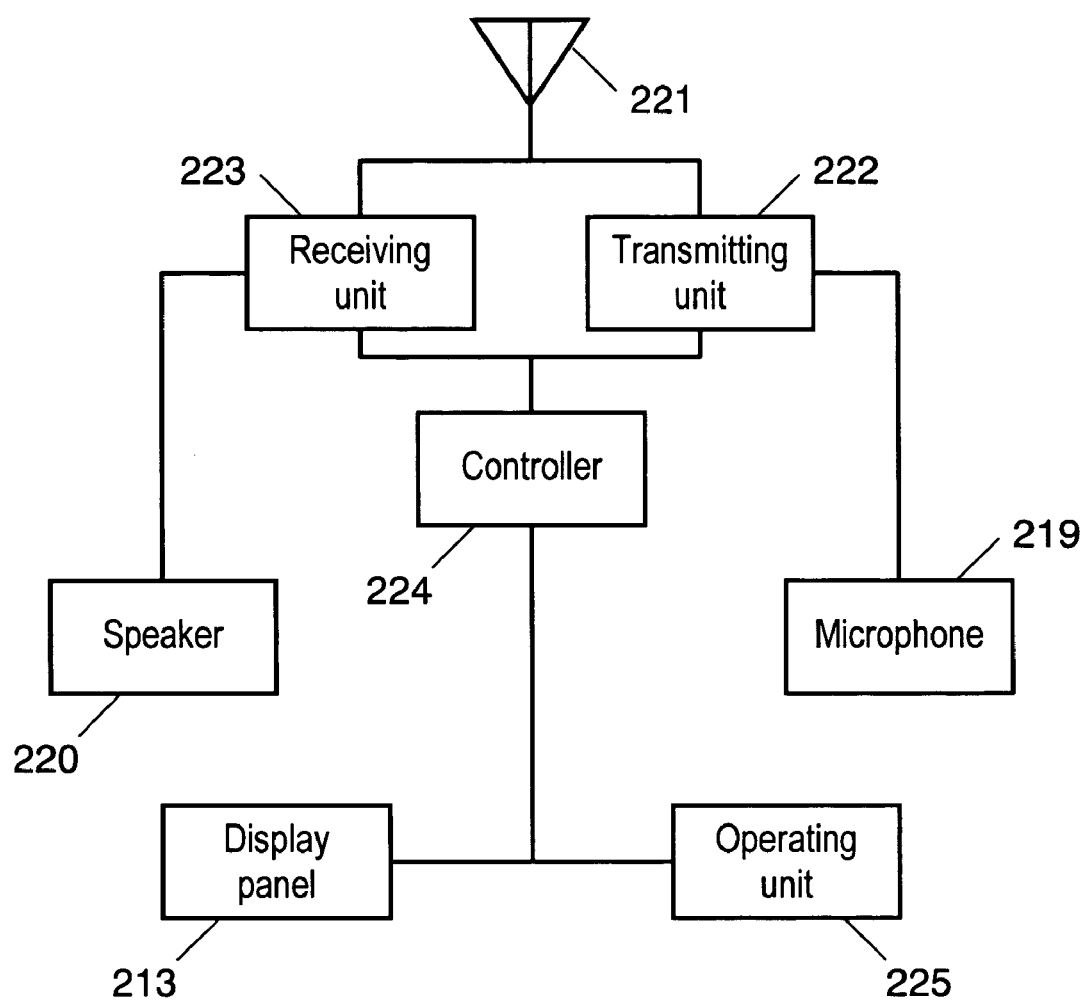
FIG. 43 is a block diagram illustrating a portable terminal in accordance with an exemplary embodiment of the present invention.

FIG. 39, FIG. 40 and FIG. 43 are a perspective view, a cross section and a block diagram of the portable terminal in accordance with the eleventh exemplary embodiment. A structure and an operation of this portable terminal are the same as those discussed in the fifth embodiment, thus the descriptions thereof are omitted here.

A structure of the surrounding of display section 213 is detailed with reference to FIG. 40, which is taken along line 500—500 of FIG. 39.

Display section 213 is disposed in a part of housing 214 made of resin. Display unit 217, comprising a semi-transparent and semi-reflecting type LCD element 215, is disposed on the surface lighting device in accordance with the ninth and tenth embodiments. Wiring 216 for display element is disposed to cover LED 201 of the surface lighting device and coupled to circuit board 212. Employing the surface lighting device in accordance with the ninth and tenth embodiments, display unit 217 realizes a small size and a low power consumption free from lowering its visibility. If stray light from LED 201 leaks from sections other than light-emitting-face 208, wiring 216 blocks almost all the leakage light, thereby improving the visibility. A display on LCD element 215 of display section 213 is seen through display-window 218 made of transparent material. By using LCD element 215, a portable terminal operating with a lower power and having excellent visibility is obtainable.

In this embodiment, side 231 of board 202 of which side wiring 216 is led out is not parallel with the same side 211a of holder 211 adjacent to board 202, and side 211a is approx. parallel with side 215a of LCD element 215 as is shown in FIG. 36. In order to downsize holder 211, holder 211 should have cut away on its side to be parallel with side 231 of board 202; however, in such a structure, wiring 216 would not keep approx. parallel with side 231 or the cut-away end section of holder 211, and thus one end of flat wiring 216 touches the end section of holder 211. This structure would damage wiring 216 due to vibration or other external forces. On the other hand, the structure of this embodiment allows wiring 216 to keep contacting solidly to side 211a of holder 211, so that wiring 216 is scarcely damaged by vibration or other external forces.

Employing the surface lighting device discussed in the ninth or tenth embodiment allows the display section of the portable terminal to reduce uneven luminance. As a result, a portable terminal with high visibility and little recognition-errors is achievable. Since only one LED is used in the device, the portable terminal consumes only little power.

In this embodiment, the surface lighting device discussed in the ninth or tenth embodiment is used; however, other devices discussed in previous embodiments can be mounted to the portable terminal with the same effects.

Exemplary Embodiment 12

Figure 29:
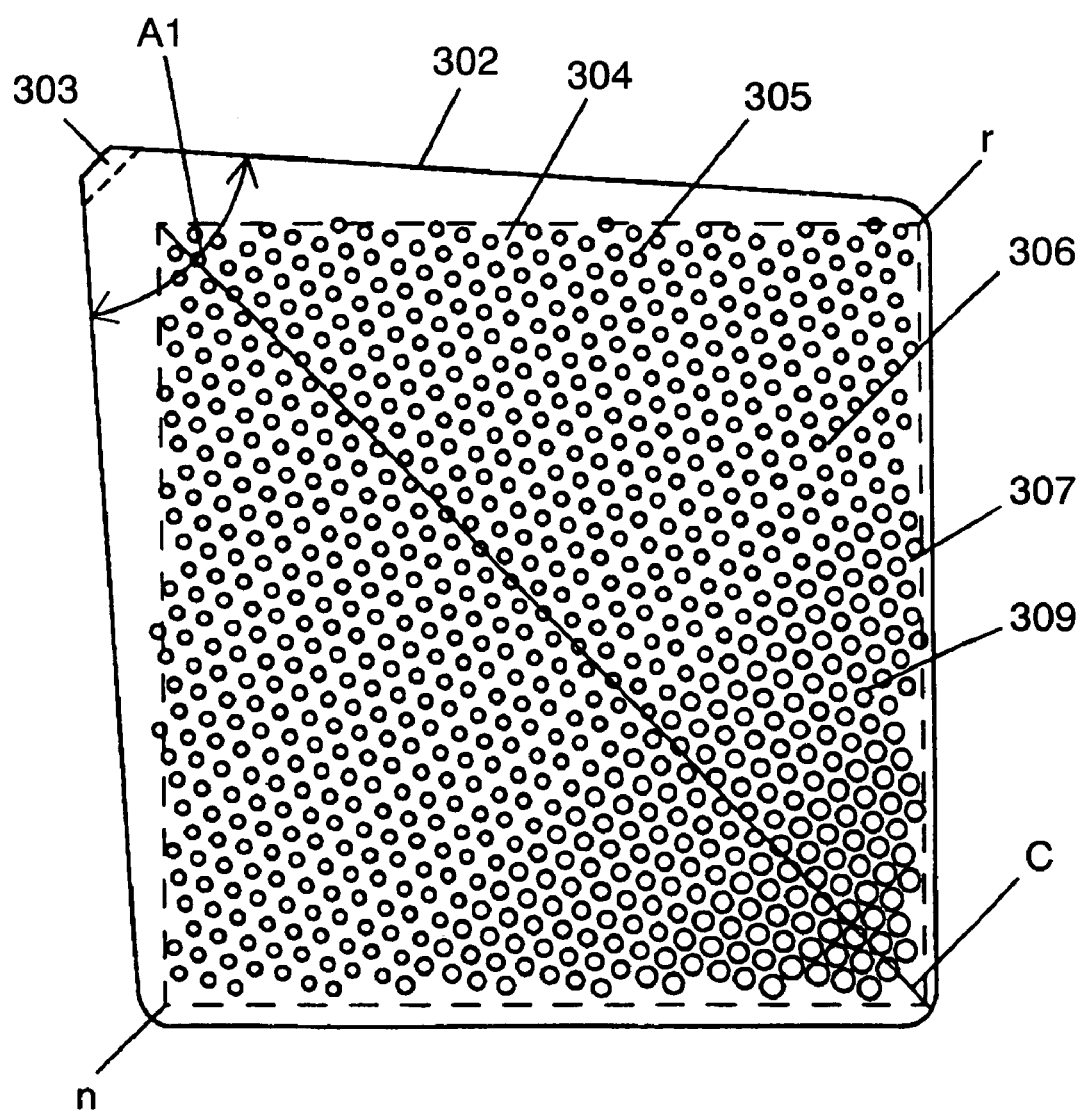
FIG. 29 is a front view of a surface lighting device in accordance with an exemplary embodiment of the present invention.
Figure 44:
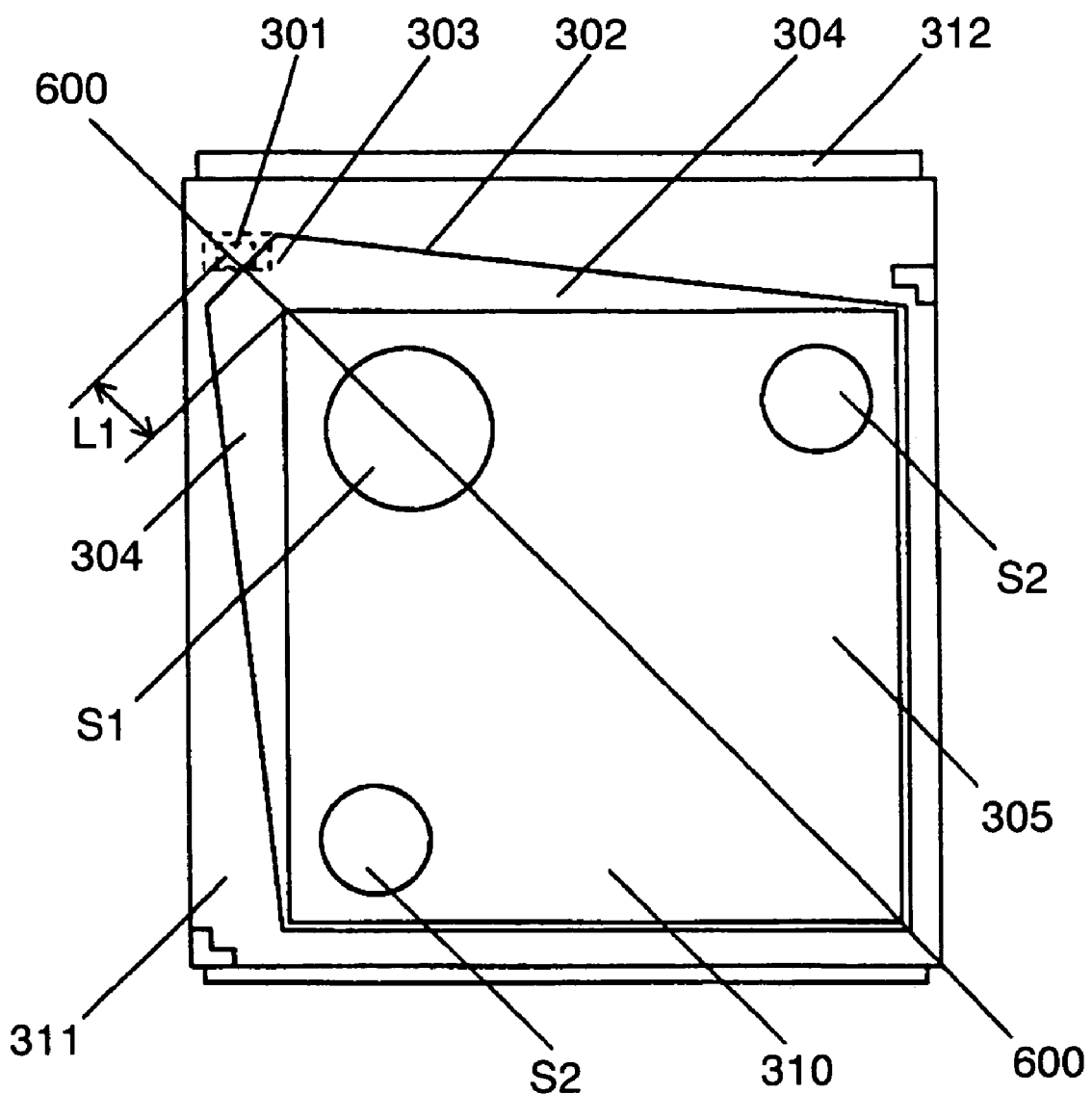
FIG. 44 is a front view of a surface lighting device in accordance with an exemplary embodiment of the present invention.
Figure 45:
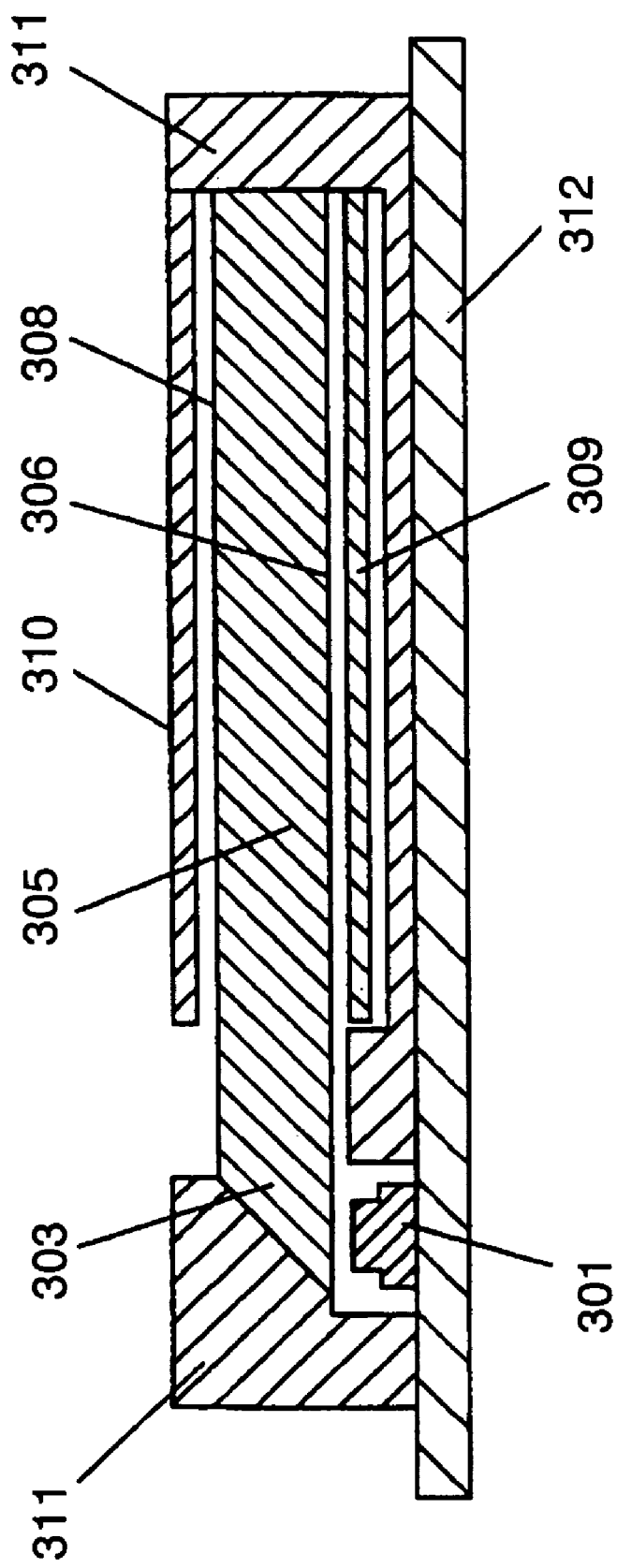
FIG. 45 is a cross section of a surface lighting device in accordance with an exemplary embodiment of the present invention.
Figure 46:
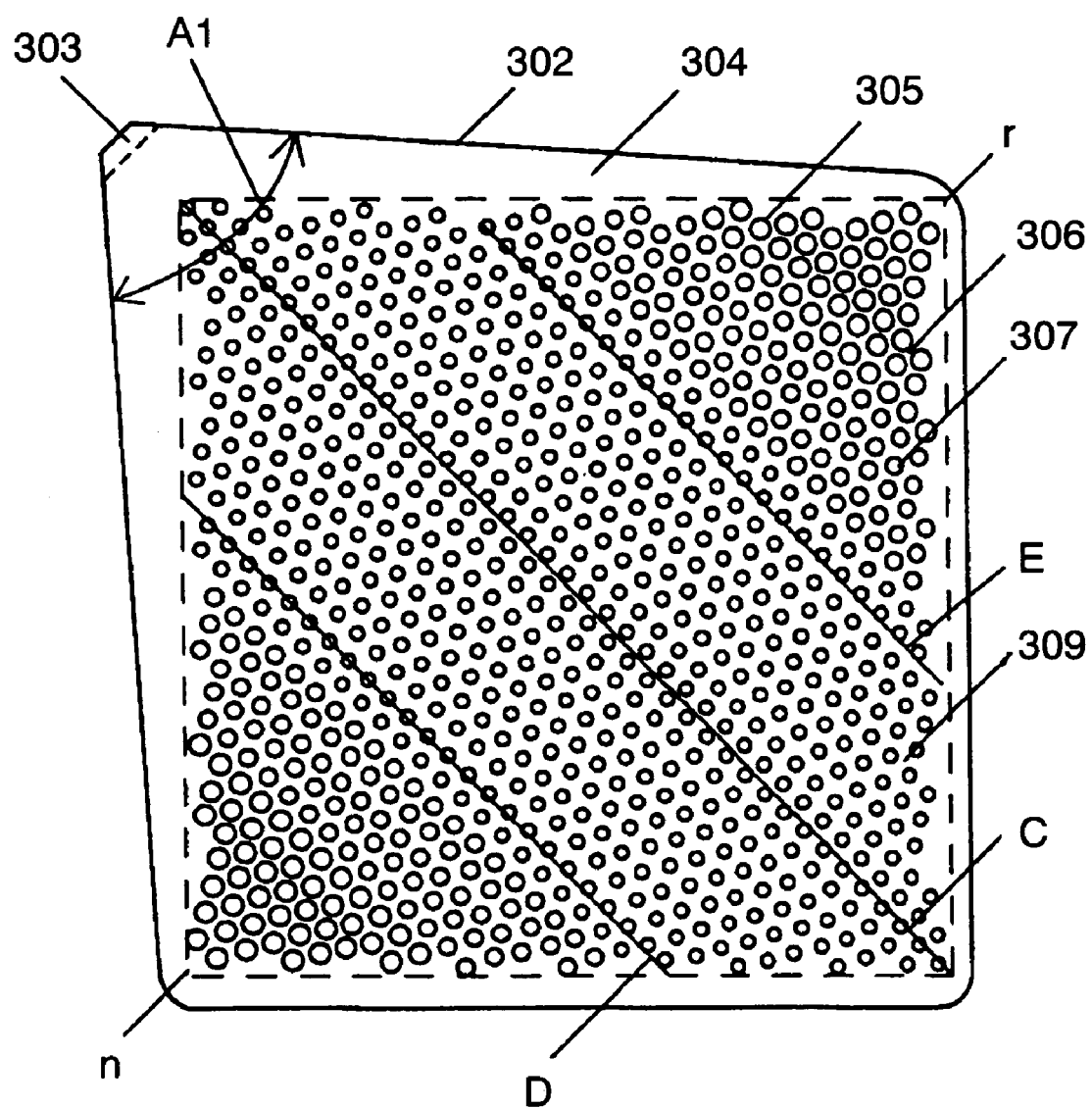
FIG. 46 is a front view of a surface lighting device in accordance with an exemplary embodiment of the present invention.

FIG. 44 is a front view of a surface lighting device in accordance with the twelfth exemplary embodiment of the present invention. FIG. 45 is a cross section taken along diagonal line 600—600 of FIG. 44. FIG. 29 and FIG. 46 are front views of a distribution on a scattering layer of this embodiment.

In FIGS. 44 through 46, LED 301 can have the same structure as LED 1 or LED 20. Light-guide-board 302 can be also made of the same material as board 2 previously discussed.

Light-guide-board 302 comprises light-inlet 303, light-guiding section 304 and light-emitting section 305. The dotted line connecting corners "r" and "n" of emitting section 305 defines an interface between light-guiding section 304 and light-emitting section 305 as shown in FIG. 46.

Light-inlet 303 guides the light inside light-guide-board 302. When LED 301 is disposed below light-guide-board 302, light-inlet 303 is formed by an incident plane and a reflecting plane which reflects incident light to emitting section 305. This reflecting plane is a slope on an end face of board 302 and is disposed approx. just above LED 301. This structure allows the light-inlet to scatter the light from LED 301, and then the light travels into the light-guiding section 304. As a result, the luminance distribution is improved and the better visibility is expected. Since LED 301 is placed below light-inlet 303, the surface lighting device can be further downsized.

In FIG. 45, light-emitting-section 305 emits the light outside. One face thereof is light-emitting face 308 that emits the light outside, and an end of the other face is diffusion section 306 comprises scattering layer 307 and optical smoothing section 309. Scattering layer 307 are printed dots and formed so that the area occupied (hereinafter referred to as "occupied area rate") by scattering layer 307 becomes greater at a closer distance to corners "n" and "r" of light-emitting-section 305 from the center of layer 307 as is shown in FIG. 46. This structure allows light-emitting-face 308 to distribute the light evenly. As a result, a surface lighting device with excellent visibility is achievable. At the same time, the light can be used more efficiently, so that the power consumption by the device can be reduced.

In this embodiment, as shown in FIG. 46, diagonal line C of light-reflecting and diffusion section 306 and two straight lines D, E disposed parallel to, equidistant from and on both sides of line C are defined. Areas occupied by scattering layer 307 near lines D and E are approx. equal to each other. The area of scattering layer 307 increases at a greater distance from diagonal line C. This structure allows light-emitting-face 308 to emitte the light more evenly, thereby realizing a surface lighting device with excellent visibility. Further, the light is used more efficiently, so that the device consumes less power.

In FIG. 29, scattering layer 307 is disposed equidistantly from diagonal line C and LED 301 so that the areas occupied by scattering layer 307 can be equal to each other. Further, scattering layer 307 is disposed so that occupied area increases at a greater distance from LED 301.

In this embodiment, light-reflecting-and-diffusion section 306 is a quadrilateral and thus diagonal line C is defined. However, when section 306 is a polygon or a circle, a line separating the occupied area equally is found and defined as diagonal line C, thereby applying the same design as discussed above.

In the case that the light enters from a corner of light-guide-board 302, the outgoing light tends to grow brighter at a section near light-inlet 303 and at a section near diagonal line C. In order to overcome this problem, the following measures already described in this embodiment are taken.

(1) Scattering layer 307 is placed so that the occupied areas become equal at an approx. same distance from diagonal line C;
(2) Scattering layer 307 is placed so that the occupied area increases at a greater distance from diagonal line C; or
(3) Scattering layer 307 is placed so that the occupied area increases at a greater distance from LED 301.

Those measures can compensate the light amount reduced at the end of light-emitting-section 308 by increasing the occupied area, and thus luminance distribution on light-emitting-face 308 becomes uniform. More preferably, combining those measures would produce the better effect.

The way of forming scattering layer 307, the material and shape thereof are the same as that discussed in the first embodiment. Layer 307 is not limited to a circular shape but it may be a polygon or a straight line. Light-reflecting-and-diffusion section 306 as a whole is not limited to one type of pattern, but various shapes can be combined.

Scattering layer 307 is formed by screen-printing; however, the layer 307 can be processed by machine-cutting or laser processing, so that fine peaks and valleys yet rough enough for reflecting and diffusing the incident light can be formed on the lower face of light-guide-board 302. On an injection mold of the light-guide board, rough face, peaks and valleys, or V-shaped grooves can be formed by etching or other methods.

Scattering layer 307 can be also made of separate material and placed close to the end face of board 2.

An operation of the surface lighting device as structured above is demonstrated hereinafter. First, the light from LED 301 enters to light-guide plate 302 through light-inlet 303. Most of the light has an angle component satisfying conditions of total reflection at an interface between resin and air, so that this light travels inside the board 302 by repeating total reflections. The light guided by total reflection is shielded efficiently; however, the light striking scattering section 307 on the lower face of light-emitting-section 306 is reflected randomly in diverse directions or travels through. Only the light having an angle greater than the critical angle at the total reflection runs out of board 302. Some light out of the light emitted from section 308 strikes reflecting sheet 309 and holder 311, and then is reflected and returned into light-emitting-section 305 again. After that, the light is emitted again from the light-emitting-face again. As such, almost all the light, except some amount absorbed on the way, guided into board 302 is emitted from emitting face 308 for surface lighting.

In this embodiment, LED 301 is placed near a corner of light-inlet 303, so that some light, out of the LED light, having strong relative intensity around P2 in FIG. 47 irradiates section S2 shown in FIG. 44. As a result, a surface lighting device having only little unevenness in luminance and excellent visibility is achievable.

Light-inlet 303 is formed by a curved face, of which cross section is arc, parallel to emitting-face 308, so that the light around P1 in FIG. 47 having strong relative intensity is distributed for irradiating section S2. This structure allows the LED light incident on section S1 of light-reflecting-diffusion section 306 to reduce its own light-intensity-distribution, thereby achieving uniform surface luminance. As a result, a surface lighting device having excellent visibility is obtainable.

When light-guide-board 302 is formed in a symmetrical shape, e.g. a square, scattering layer 307 is placed on diagonal line C of section 306 so that the scattering pattern becomes symmetrical with respect to line C. This structure produces surface luminance more uniformly.

In the case that light-guide-board 302 is formed in a symmetrical shape, e.g. a square, if diagonal line C of light-reflecting-and-diffusion section 306 is placed on a diagonal line (not shown) of board 302, i.e. these two lines are approx. on the same line, light-reflecting-and-diffusion-section 306 functions most efficiently and produces a better luminance distribution thereof.

The structure discussed above reduces luminance difference between section S2 in FIG. 44 and section S1 being irradiated by mainly relatively intensified light, so that luminance distribution is improved. This structure produces luminance ratio R=at least 0.5. This structure also realizes a relative light intensity of the light irradiating section S2 vs. that of S1 being not less than 70%. This proves that the visibility of the surface lighting device is improved.

A sample light-guide-board in accordance with this twelfth embodiment is produced having the scattering dots structured as follows: A dot on the scattering layer closest to the diagonal line is 0.4 mm in diameter, another dot farthest from the diagonal line is 0.8 mm in diameter, and a clearance between the adjacent dots is 1 mm. One green GaN LED is used, emitting face is a square of which side measures 30 mm long, light-guiding-route length L1 is 3 mm, and a thickness of the light-guide-board is 1 mm. Electric current in the LED is 10 mA. Luminance distribution of this surface lighting device having the structure discussed above is measured, and resultant R is 0.68. In actual, luminance distribution is so improved that it is rarely seen on the device viewed through an LCD element. This embodiment proves that the surface lighting device with extraordinarily excellent visibility is realized.

As this discussed above, the 12th embodiment proves that the surface of the device emits the light more uniformly than conventional devices, and uses the light more efficiently, thereby obtaining the surface lighting device operating at less power.

What is claimed is:

1. A surface lighting device comprising:
   a light-guide-member including:
   a light-inlet plane;
   an inclined light reflecting plane above said light inlet plane for directly reflecting light entering through said light inlet plane;
   a light-guiding-section;
   a light-emitting-plane and side planes extending from opposite sides of the light reflecting plane; and
   a light source disposed on a corner of said light-guide-member,
   wherein an angle formed by said side planes of said light-guide-member, where said light-inlet plane exists between the side planes, is an acute angle.

2. The surface lighting device as defined in claim 1, wherein at least one of the two planes approaches a emitting face at greater distance from said light source.

3. The surface lighting device as defined in claim 1 further comprising a diffused reflection board disposed parallel to said light-emitting-section.

4. The surface lighting device as defined in claim 2, wherein at least one of the two planes approaches a emitting face at greater distance from said light source.

5. The surface lighting device as defined in claim 1, wherein said light-inlet plane includes an end face slant with respect to said light-emitting-section and an incident plane, and said light source is disposed on an opposite side of said end face, where said incident face exists in-between.

6. The surface lighting device as defined in claim 5, wherein the end face of said light-inlet plane comprises a curved face widening in sector shape from near said light source.

7. The surface lighting device as defined in claim 1, wherein said light source is a light-emitting-diode having a substantially concave face.

8. The surface lighting device as defined in claim 1, wherein said light source is a single piece of light-emitting-diode.

9. The surface lighting device as defined in claim 1, wherein the light-emitting-diode comprises a plurality of light emitting elements.

10. A surface lighting device according to claim 1 wherein two sides of said light-guiding-section are along two sides of said light-emitting-plane.

11. A surface lighting device according to claim 10, wherein said two sides of said light guiding section form a "V" shape.

12. A display unit comprising:
    a liquid crystal display element; and
    a surface lighting device comprising;
    a light-guide-member including:

a light-inlet plane;

an inclined light reflecting plane above said light inlet plane for directly reflecting light entering through said light inlet plane;

a light-guiding-section;

a light-emitting-plane and side planes extending from opposite sides of the light reflecting plane; and a light source disposed on a corner of said light-guide-member, wherein an angle formed by said side planes of said light-guide-member, where said light-inlet exists between the side planes, is an acute angle.

13. The display unit as defined in claim 12, wherein said light source is disposed on a side where a wiring of the liquid crystal display element is led out.

14. The surface lighting device as defined in claim 12, wherein two sides adjacent to said light source are longer than other sides respectively.

15. The surface lighting device as defined in claim 12, wherein said light source includes at least one light-emitting-element.

16. A portable terminal comprising:

a liquid crystal display element; and a surface lighting device comprising;

a light-guide-member including:

a light-inlet plane;

an inclined light reflecting plane above said light inlet plane for directly reflecting light entering through said light inlet plane;

a light-guiding-section;

a light-emitting-plane and side planes extending from opposite sides of the light reflecting plane; and a light source disposed on a corner of said light-guide-member, wherein an angle formed by said side planes of said light-guide-member, where said light-inlet exists between the side planes, is an acute angle.

17. A portable terminal comprising:

a surface lighting device comprising:

a light-guide-member including:

a light-inlet plane;

an inclined light reflecting plane above said light inlet plane for directly reflecting light entering through said light inlet plane;

a light-guiding-section;

a light-emitting-plane and side planes extending from opposite sides of the light reflecting plane; and a light source disposed on a corner of said light-guide-member, wherein an angle formed by said side planes of said light-guide-member, where said light-inlet exists between the side planes, is an acute angle, and a liquid crystal display element.

18. A surface lighting device comprising:

a light-guide-member including:

a light inlet plane on a bottom of said light-guide-member;

an inclined light reflecting plane above said light inlet plane;

a light-emitting-plane on a top of said light-guide-member; and side planes extending from opposite sides of the light reflecting plane; and wherein an angle formed by a corner of said light-guide-member where the inclined light reflecting plane is disposed is less than an angle of an opposite corner of said light-guide-member.

19. A surface lighting device according to claim 18, further comprising a light source disposed at said corner of said light-guide-member.

* * * * *

UNITED STATES PATENT AND TRADEMARK OFFICE
CERTIFICATE OF CORRECTION

| | | |
|---|---|---|
| PATENT NO. | : 7,088,333 B1 | Page 1 of 1 |
| APPLICATION NO. | : 09/524587 | |
| DATED | : March 13, 2000 | |
| INVENTOR(S) | : Seiji Manabe et al. | |

It is certified that error appears in the above-identified patent and that said Letters Patent is hereby corrected as shown below:

<u>Title Page, Item (30) Foreign Application Priority Data</u>
Change "Mar. 15, 1919 (JP) 11-068166"
To -- Mar. 15, 1999 (JP) 11-068166 --

<u>Title Page, Item (56) References Cited, OTHER PUBLICATIONS</u>
Change "Japanese Official Action dated Apr. 23, 2002 for 11-289,519"
To -- Japanese Official Action dated Apr. 23, 2002 for 11-286,519 --

Signed and Sealed this

Sixth Day of February, 2007

JON W. DUDAS
*Director of the United States Patent and Trademark Office*

UNITED STATES PATENT AND TRADEMARK OFFICE
CERTIFICATE OF CORRECTION

PATENT NO.        : 7,088,333 B1
APPLICATION NO.   : 09/524587
DATED             : August 8, 2006
INVENTOR(S)       : Seiji Manabe et al.

Page 1 of 1

It is certified that error appears in the above-identified patent and that said Letters Patent is hereby corrected as shown below:

<u>Title Page, Item (30) Foreign Application Priority Data</u>
Change "Mar. 15, 1919 (JP) 11-068166"
To -- Mar. 15, 1999 (JP) 11-068166 --

<u>Title Page, Item (56) References Cited, OTHER PUBLICATIONS</u>
Change "Japanese Official Action dated Apr. 23, 2002 for 11-289,519"
To -- Japanese Official Action dated Apr. 23, 2002 for 11-286,519 --

This certificate supersedes Certificate of Correction issued February 6, 2007.

Signed and Sealed this

Sixth Day of March, 2007

JON W. DUDAS
*Director of the United States Patent and Trademark Office*